United States Patent [19]

Yoshioka et al.

[11] Patent Number: 5,349,450
[45] Date of Patent: Sep. 20, 1994

[54] COLOR FACSIMILE APPARATUS

[75] Inventors: Kiyoharu Yoshioka, Yokohama; Koji Arai, Kawasaki, both of Japan

[73] Assignee: Canon Kabushiki Kaisha, Tokyo, Japan

[21] Appl. No.: 989,915

[22] Filed: Dec. 11, 1992

Related U.S. Application Data

[63] Continuation of Ser. No. 670,256, Mar. 15, 1991, abandoned.

[30] Foreign Application Priority Data

Mar. 16, 1990 [JP] Japan ................... 2-66113
Mar. 16, 1990 [JP] Japan ................... 2-66114
Mar. 16, 1990 [JP] Japan ................... 2-66115

[51] Int. Cl.⁵ ........................... H04N 1/46
[52] U.S. Cl. ........................... 358/500; 358/502
[58] Field of Search ............ 358/500, 501–504, 358/534; 346/140 R, 1.1

[56] References Cited

U.S. PATENT DOCUMENTS

| | | | |
|---|---|---|---|
| 4,308,553 | 12/1981 | Roetling | 358/75 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,739,397 | 4/1988 | Hayashi | 358/75 |
| 4,740,796 | 4/1988 | Endo et al. | 346/1.1 |
| 4,893,179 | 1/1990 | Ito | 358/79 |

FOREIGN PATENT DOCUMENTS

| | | |
|---|---|---|
| 3408321 | 9/1984 | Fed. Rep. of Germany . |
| 59-123670 | 7/1984 | Japan . |
| 59-138461 | 8/1984 | Japan . |
| 61-137487 | 6/1986 | Japan . |

*Primary Examiner*—Stephen Brinich
*Attorney, Agent, or Firm*—Fitzpatrick, Cella Harper & Scinto

[57] ABSTRACT

A color facsimile apparatus includes a plurality of color ink jet heads for different colors. The apparatus comprises instructing circuitry for instructing monochromatic printing of data received in a color receiving mode, and a controller for controlling image data received in a color receiving mode according to a signal from the instructing circuitry for recording of data by a monochromatic ink jet head.

26 Claims, 22 Drawing Sheets

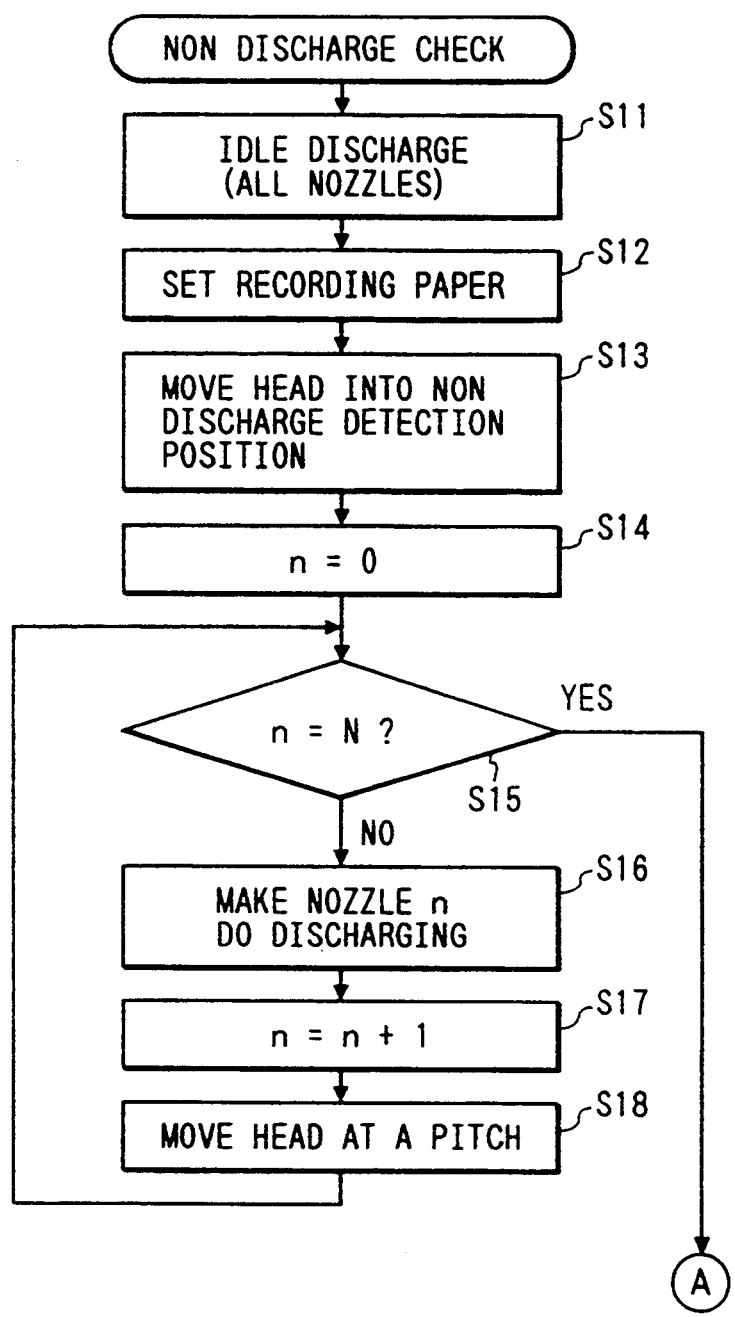

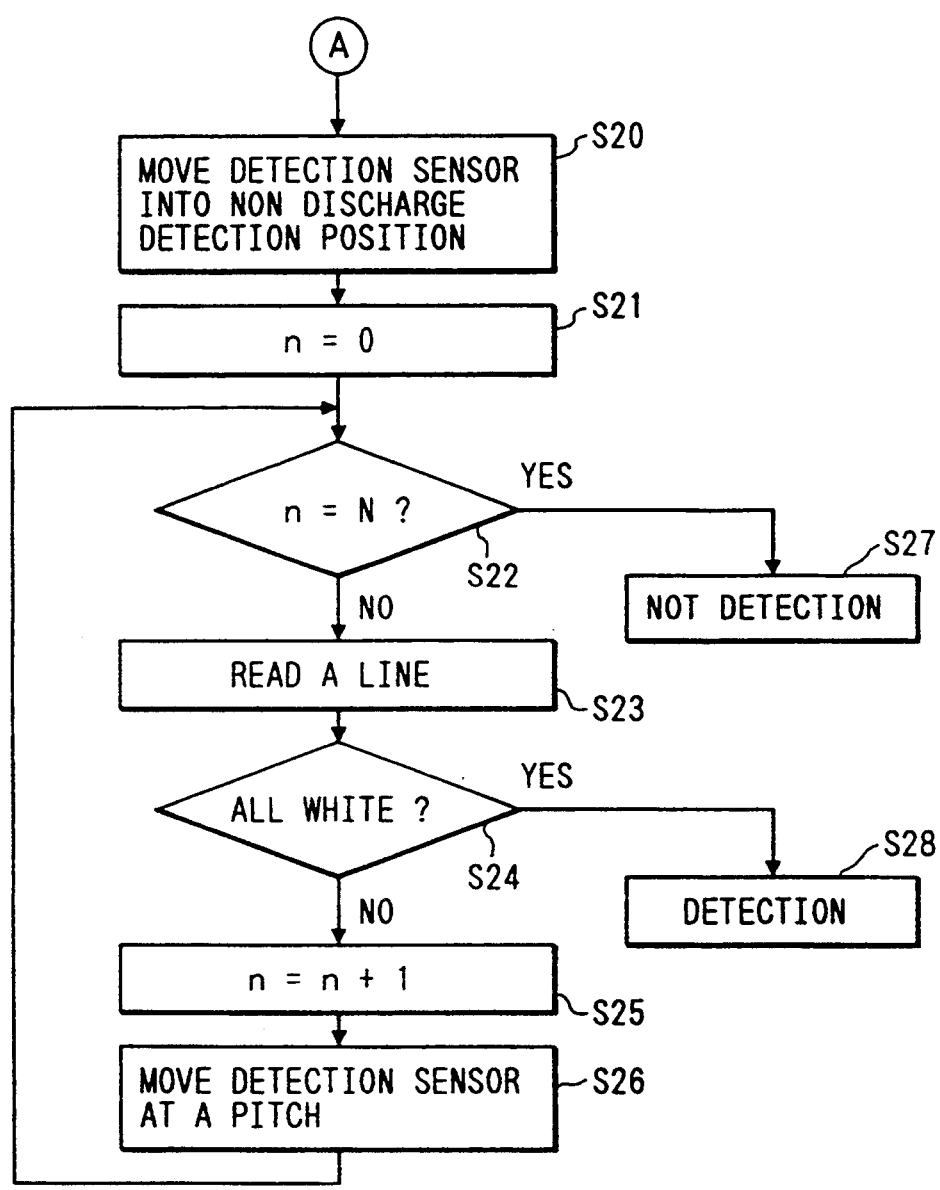

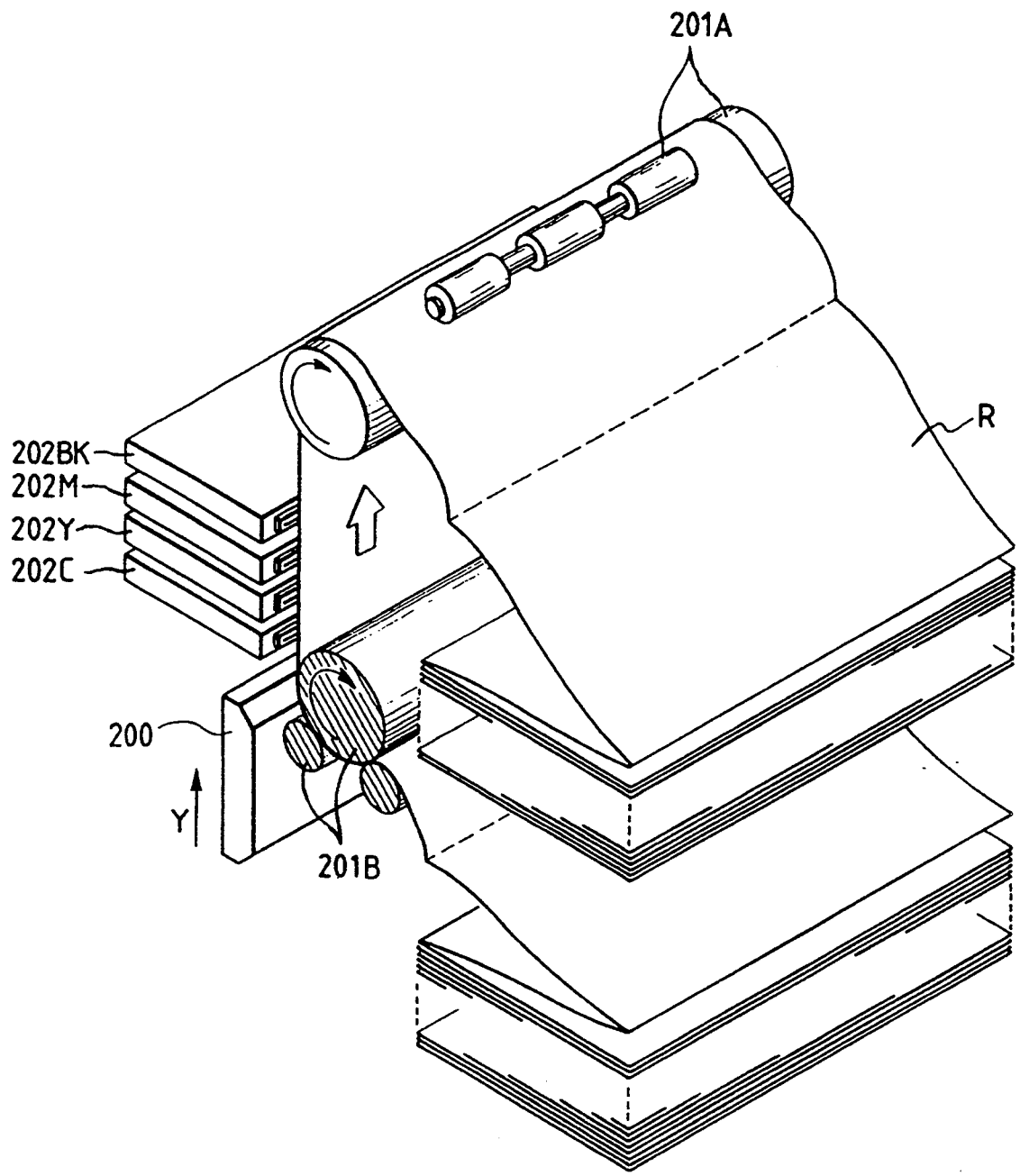

| FIG. 12A | FIG. 12B |

COLOR FACSIMILE APPARATUS

This application is a continuation of application Ser. No. 07/670,256 filed Mar. 15, 1991, abandoned.

BACKGROUND OF THE INVENTION

1. Field of the Invention

This invention relates to a color facsimile apparatus.

2. Related Background Art

Recently, color facsimile apparatuses have been proposed. For such color facsimile apparatuses, various types of printers are proposed.

Recently, an ink jet printer of bubble jet type has been proposed, which utilizes bubbles generated by thermal energy for discharging ink from nozzle toward a printing medium to print characters, images, etc. on the printing medium. In this printer, a heat-generating resistor (i.e., a heater) provided in each orifice is far smaller in size than the piezoelectric element used in the conventional ink jet printer. Thus, it permits high density multiplex arrangement of orifices to obtain high quality print image, as well as permitting high speed and low noise operation.

Meanwhile, the facsimile apparatus is required to be capable of not merely transmitting image at high speed but also receiving higher quality image at high speed. The bubble jet type ink jet printer as noted above is thought to be one of printers which can meet the above requirements.

However, in such color facsimile apparatus, if it is intended to full color print data received in a color receiving mode at all time, it is necessary to perform printing in;, for instance, four colors of yellow, magenta, cyan and black. Thus, the printing takes long time, and the received data can not be quickly confirmed.

Further, where printing is done in color at all times, a great quantity of ink is required.

Further, the above ink jet printer has the following problem.

The orifices of the recording head are subject to clogging caused by ink having viscosity increased due to non-use of the head, low relative humidity environment and difference in recording frequency or by attachment of dust. Accordingly, a discharge recovery mechanism is provided for removing ink of increased viscosity by causing forced discharging of increased viscosity ink from the inside of the orifices or withdrawing ink through a cap covering and protecting the head nozzle. In addition, when the recording head is out of use, its orifices are held covered by the cap to prevent non-discharge of ink.

However, even with the provision of the above measure, clogging of the ink nozzle is liable in such case as when the recording head has been out of use for long time or in a comparatively dry room because ink passages of ink nozzles are actually very narrow. Further, if some nozzles are used at a very low frequency during printing operation, they are liable to be clogged in the next printing.

Where such a printer is used for a facsimile apparatus, despite normal communication a white streaked or fringe-like pattern is generated in the output image to cause deterioration of image quality or missing information. To solve this problem, it may be thought to permit automatic monitoring of the state of the head before printing and refuse communication if the head is abnormal. However, if automatic reception is set for long time absence, the state of refusal of reception is inconveniently maintained for long time.

Particularly, in case of a color recording apparatus, three ink heads for respective colors of yellow, magenta and cyan are necessary, and therefore the probability of abnormal state of any one of the heads and probability of state of inability of reception are high.

The above problem is encountered not only in ink jet recording but also other recording systems where color image is reproduced for each color, for instance a thermal printer and electrophotographic system.

Meanwhile, in a bubble jet type ink jet printer for full color recording, recording heads for three different colors of Y, M and C or four different colors of Y, M, C and Bk are provided in a row or juxtaposed state such as to form images with relative movement of the ink heads and recording paper in the direction of the row.

For realizing a color facsimile apparatus, which can receive color image signal with such a color ink jet printer, it is important to permit high speed recording control.

SUMMARY OF THE INVENTION

An object of the invention is to provide a color facsimile apparatus, which can solve all or at least one of the problems discussed above.

Another object of the invention is to provide a color facsimile apparatus, which can permit quick confirmation of received data.

A further object of the invention is to provide a color facsimile apparatus which is adapted to prevent the receiving state as much as possible.

A still further object of the invention is to provide a multi-function color facsimile apparatus.

In a preferred embodiment of the invention, there is provided a color facsimile apparatus having a plurality of color ink jet heads for different colors, which comprises instructing means for instructing monochromatic printing of data received in a color receiving mode, and control means for controlling image data received in a color receiving mode according to a signal from the instructing means for recording of data by a monochromatic ink jet head.

A further object of the invention is to provide a facsimile apparatus capable of high speed color printing.

A yet further object of the invention is to provide a facsimile apparatus having a novel function.

Yet another object of the invention is to provide a novel ink jet recording apparatus.

The above and other objects and features of the invention will become apparent from the following description of embodiment and drawings.

BRIEF DESCRIPTION OF THE DRAWINGS

FIG. 7 is a flow chart illustrating a non-discharge check control operation procedure in an embodiment of the invention;

FIG. 8 is a perspective view showing a full-line printer as a different embodiment of the invention;

DETAILED DESCRIPTION OF THE PREFERRED EMBODIMENTS

Construction of recording system (or printer)

Figure 2:
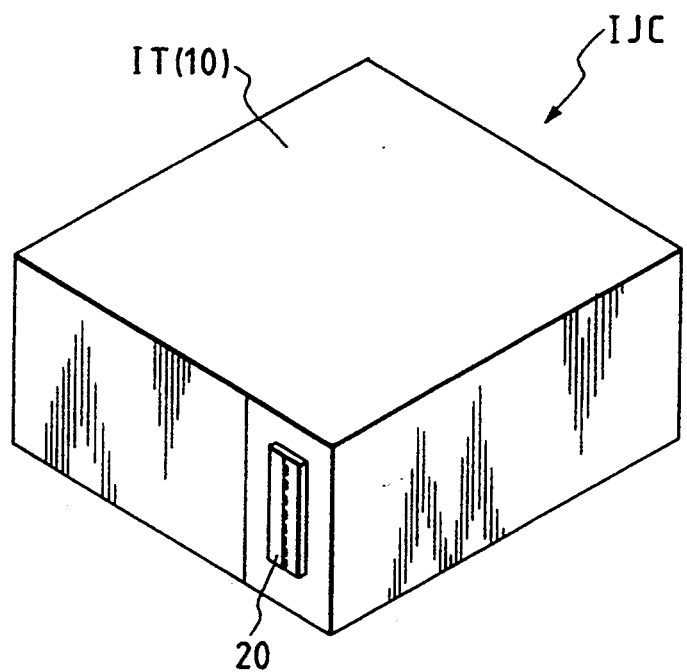
FIG. 2 is a perspective view showing an example bubble jet type ink jet cartridge, to which the invention is applicable.
Figure 3:
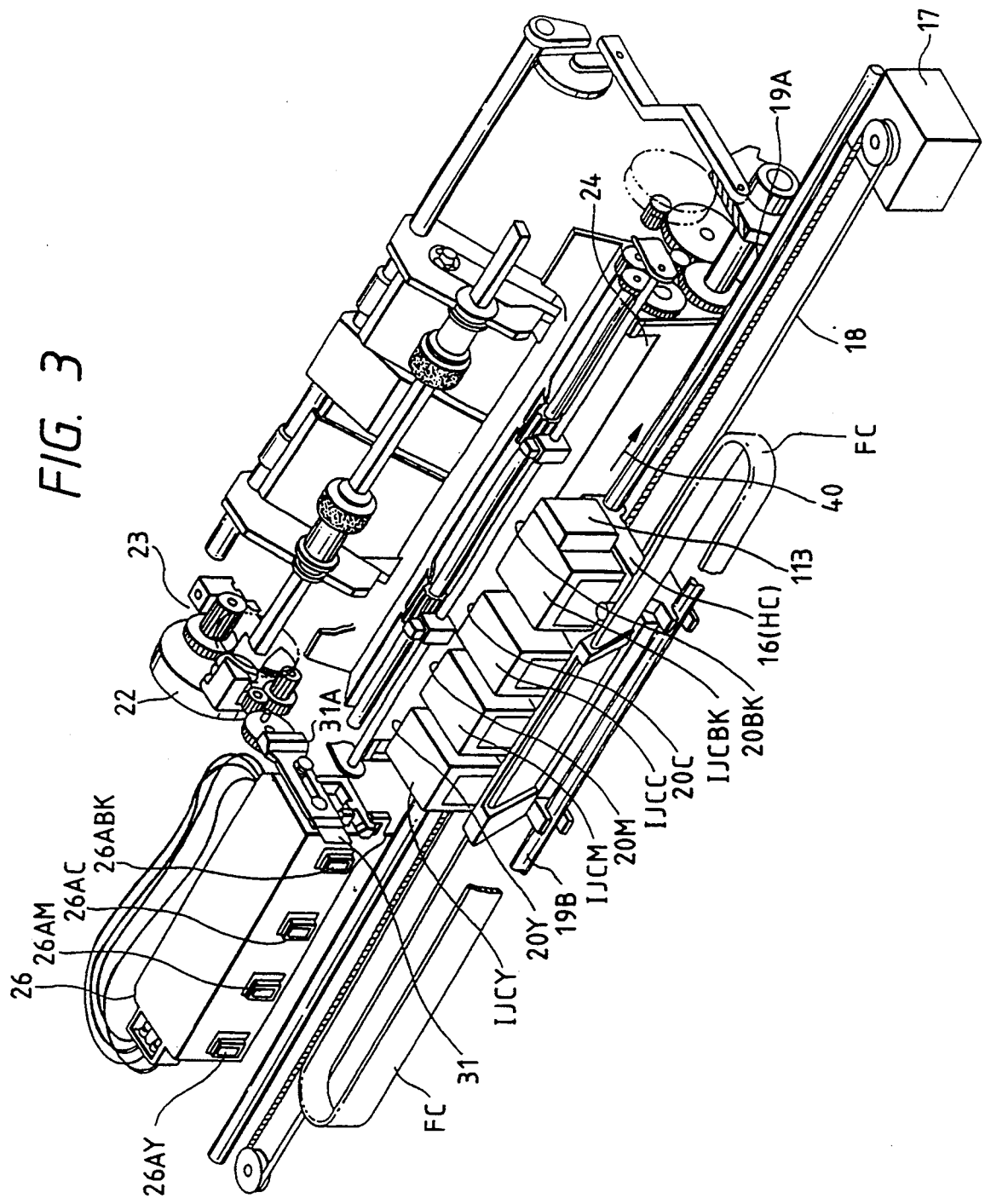
FIG. 3 is a perspective view showing the construction of a recording system of a facsimile apparatus, to which the invention is applicable.

FIGS. 2 and 3 show an example of ink jet printer suitable as a recording system of a facsimile apparatus according to the invention. Referring to the Figures, designated at 20 is an ink jet head (or recording head) of bubble jet system, and at IJC is an ink jet cartridge integral with ink jet head 20 and provided with ink tank IT for supplying ink to the head.

Ink jet cartridge IJC in this embodiment is such that ink jet head 20 has an end slightly projecting from the front surface of ink tank IT, as seen from the perspective view of FIG. 2. Ink jet head catridge IJC is secured to and supported by a carriage which is mounted in ink jet recording apparatus IJRA as will be described later. It is of disposable type and can be mounted on and dismounted from the carriage.

First ink tank IT (10) stores ink supplied to ink jet head IJH. It includes an ink absorbing member, a vessel accommodating the ink absorbing member and a lid member sealing the vessel (these components all being not shown). Ink filling ink tank IT (10) is progressively supplied to the ink jet head side according to ink discharge. The ink jet head is provided with a residual ink amount check mechanism for checking the residual amount of ink, and the residual amount of ink can be detected from CPU 101 of the apparatus.

Ink jet cartridge IJC having the above construction is detachably mounted in a predetermined way in carriage HC of ink jet recording apparatus IJRA, and relative movement of carriage HC and recording medium is controlled according to a predetermined recording signal for forming a desired record image.

Individual color cartridges IJCBk (black), IJCC (cyan), IJCM (magenta) and IJCY (yellow) have the same construction. Cartridge IJCBk has an ink tank of a slightly increased size from considerations of high frequency of use in monochromatic image reception.

FIG. 3 is a perspective view showing ink jet recording apparatus IJRA provided with a mechanism for the above processing.

Referring to the Figure, designated at 20Bk, 20C, 20M and 20Y are individual color ink jet heads (or recording heads) of ink jet head cartridge IJC provided with nozzles for discharging ink against the recording surface of recording paper fed over platen 24. Designated at 16 is a head carriage HC holding recording head 20. The head carriage is coupled to a portion of drive belt 18 for transmitting drive force of drive motor 17 and is slidable along two parallel guide shafts 19A and 19B for reciprocal movement over the entire width of recording paper in recording head 20.

Figure 1:
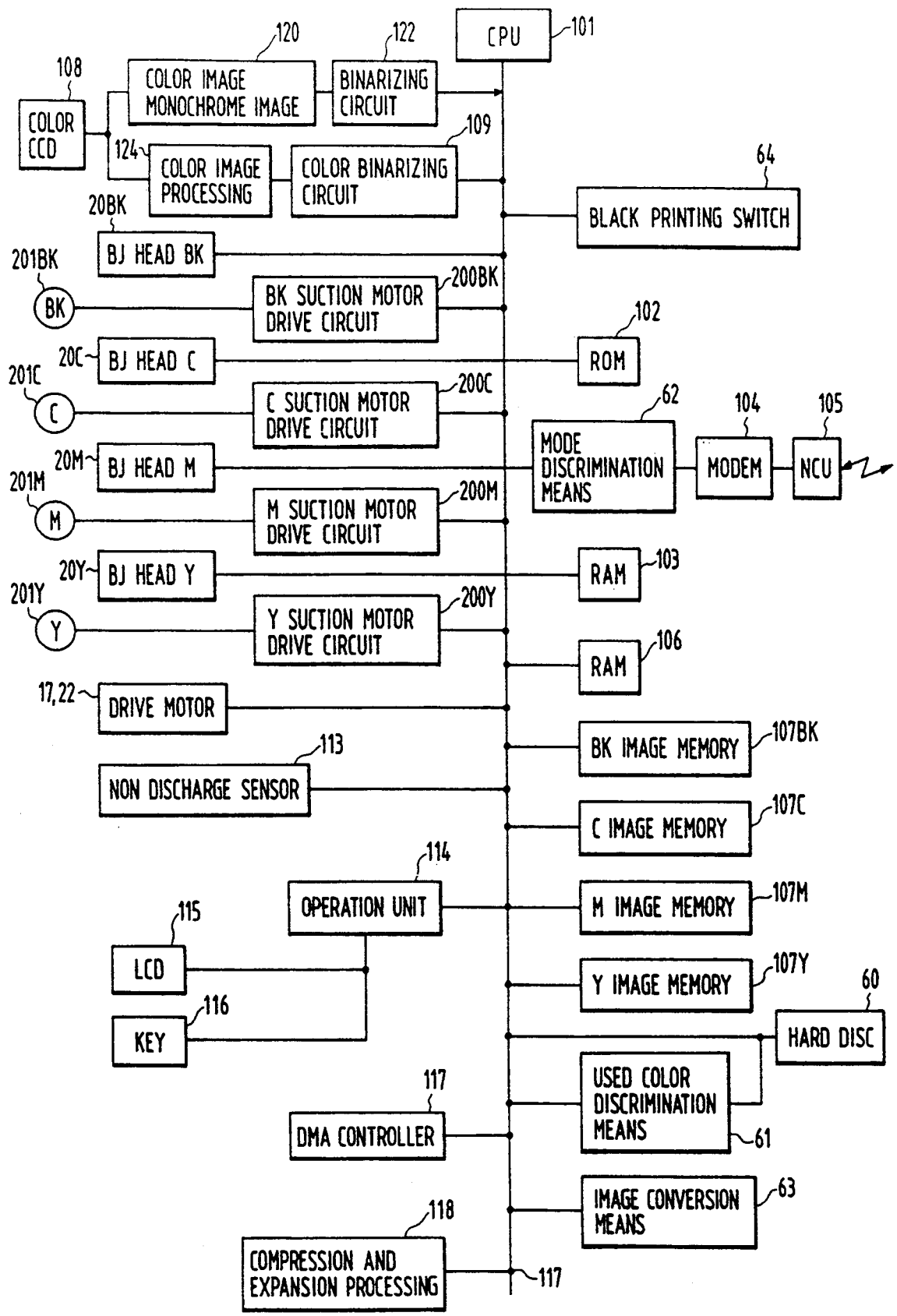
FIG. 1 is a block diagram showing the basic construction of an embodiment of the invention.

Designated at 22 in FIG. 1 is a control circuit for controlling the driving of drive motor 17. The circuit controls the displacement of head carriage HC according to a command from CPU 101. In recording, head carriage HC is moved in the direction of arrow 40 in the order of ink jet cartridges disposed in head carriage HC, i.e., in the order of black, cyan, magenta and yellow. The individual color cartridges are spaced apart from one another in the direction of movement, thus providing different timings of recording corresponding to the spacing. For recording over the entire paper width, the carriage is located at a position corresponding to the leading end of paper at the start of line recording and is located at a position corresponding to the trailing end of paper at the end of line recording. This means that the distance provided for being covered by the carriage is in excess of the distance in the monochromatic case by the spacing between ink jet heads 20Bk and 20Y.

Designated at 26 is a head recovery unit disposed at one end of the path of movement of recording head 20, for instance at a position facing a home position. Head recovery unit 26 is operated by drive force of motor 22 transmitted through transmitting mechanism 23, thus effecting capping of recording head 20. In an interlocked relation to the capping of recording head 20 by cap unit 26A of head recovery unit 26, a discharge recovery process is performed to remove ink of increased viscosity through forced discharge of ink from orifices. This is done by absorbing ink with suitable absorbing means (for instance an absorbing pump) provided in head recovery unit 26 or pumping of ink through suitable pumping means provided in the ink supply path leading to recording head 20. Further, when recording is ended, the recording head is capped for protection.

Cap unit 26A has caps 26ABk, 26AC, 26AM and 26AY for respective colors. These caps are disposed in correspondence to the distances of the respective heads provided on the carriage, and with the carriage at home position thereof, the individual heads are found at positions facing the respective caps.

Figure 5:
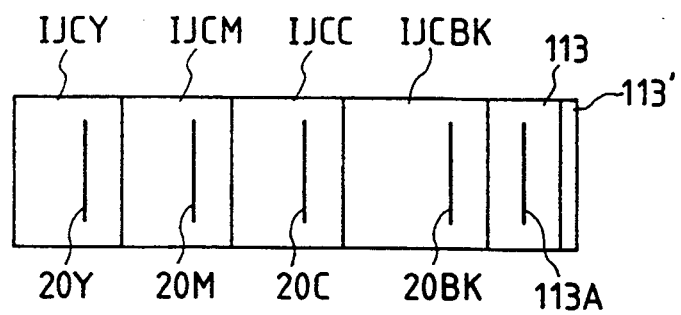
FIG. 5 is a plan view showing an example of a non-discharge sensor.

Designated at 113 is a non-discharge sensor including photoelectric conversion element array 113A such as a photosensor array for checking for attached ink having been discharged from head 20 for each dot. As shown in FIG. 5, array 113A extends parallel to and has a length equal to or slightly greater than the length of the nozzle group of head 20. Non-discharge sensor 113 is mounted on carriage 16 (see FIG. 3) at a position near head 20, and it is retreated with respect to the orifices of head 20 lest photoelectric conversion element array 113A should touch blade (or wiper) 31. It includes white illumination light source 113' and can detect the state of ink of individual colors recorded on recording paper from reflected light.

Designated at 31 is a blade provided on a side surface of head recovery unit 26. The blade is made of silicone rubber and serves as a wiping member. Blade 31 is supported in a canti-lever fashion by blade support 31A. Like head recovery unit 26, it is operable by motor 22 and transmission mechanism 23 for engagement with the discharge surface of recording head 20. At an adequate timing in the recording operation of recording head 20 or after discharge recovery operation of head recovery unit 26, blade 31 is projected into the path of movement of recording head 20, thus effecting wiping of dew, ink or dust away from the discharge surface of head 20.

Construction of control system

Figure 11:
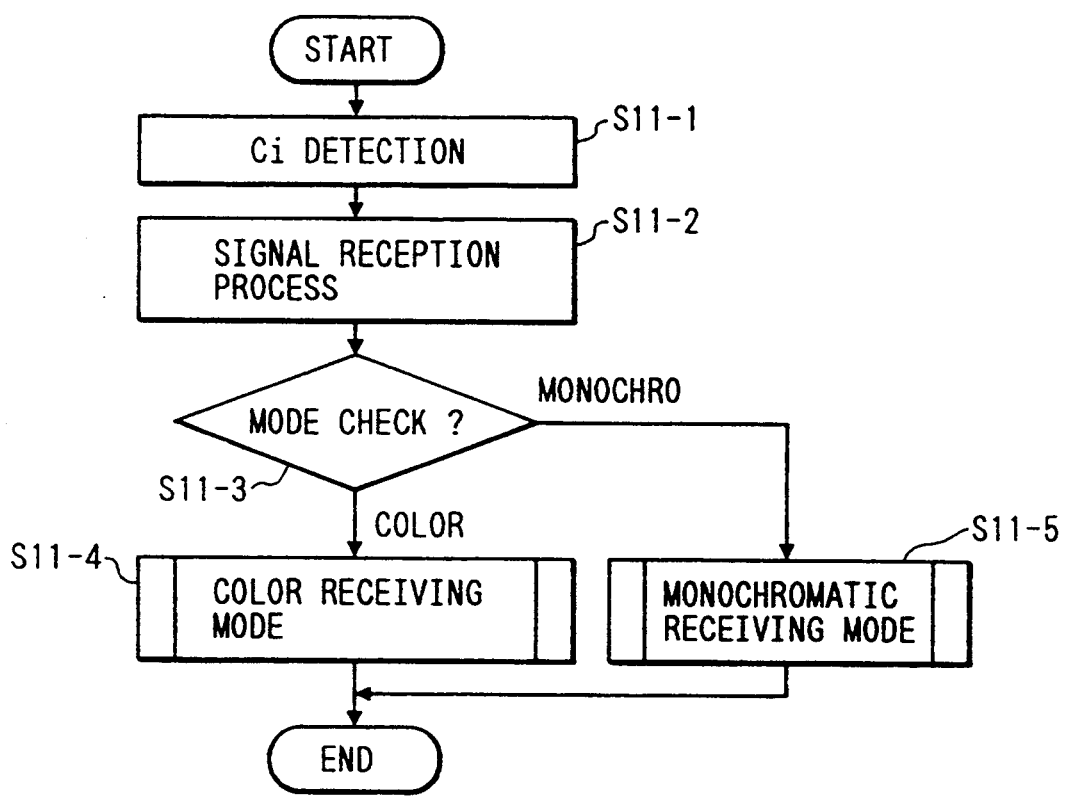
FIG. 11 is a flow chart illustrating a main routine of control according to the invention.

FIG. 1 shows the circuit construction of a facsimile system as embodiment of the invention. Referring to the Figure, designated at 101 is a main CPU (central processing unit) consisting of a microcomputer or the like for effecting control of the whole apparatus for transmission and reception of data through bus 117. Designated at 102 is a ROM (read-only memory) for storing contents of various control procedures (or programs) of CPU 101 as shown in FIG. 11. Designated at 103 is a work RAM (random access memory) used by CPU 101 for counters, registers, etc. Designated at 104 is a modulation/demodulation unit (MODEM) for data transmission. Designated at 105 is a network control unit (NCU) connecting MODEM 104 to a public telephone line. Designated at 106 is a RAM for registration of such data as telephone numbers and abbreviations. Designated at 107 is an image RAM (DRAM) for tentatively storing image data at the time of recording. Image RAM 107 has sections 107Bk, 107C, 107M and 107Y for the respective colors. Designated at 60 is a hard disk, on which received image data is once preserved. The hard disk is not limitative as medium for data preservation, and it is possible to use other media such as semiconductor memories or tapes as well.

Designated at 61 is color-for-use determining means for determining color for use by monitoring a data block (i.e., 8-line image data) to be recorded next among image data preserved in hard disk 60.

Recording operation is performed while executing idle discharge as recovery process at a fixed interval for preventing clogging. Assuming the longitudinal dimension of the ink jet nozzle shown in FIG. 2 to correspond to one line, the idle discharge noted above is executed for every eight lines. Eight lines are dealt with as one block, and image data of the next block is monitored for each color. More specifically, image data is expressed as binary data of "1", representing the provision of ink, and "0", representing the provision of no ink. If "1" is present in the monitored block, judgement data of "1" is provided. In this way, 4-bit data with individual bits assigned black, cyan, magenta and yellow in the mentioned order is produced and supplied to CPU 101. The idle discharge is executed according to this 4-bit data. While the idle discharge is executed for every eight lines in this embodiment, this is by no means limitative.

Figure 4:
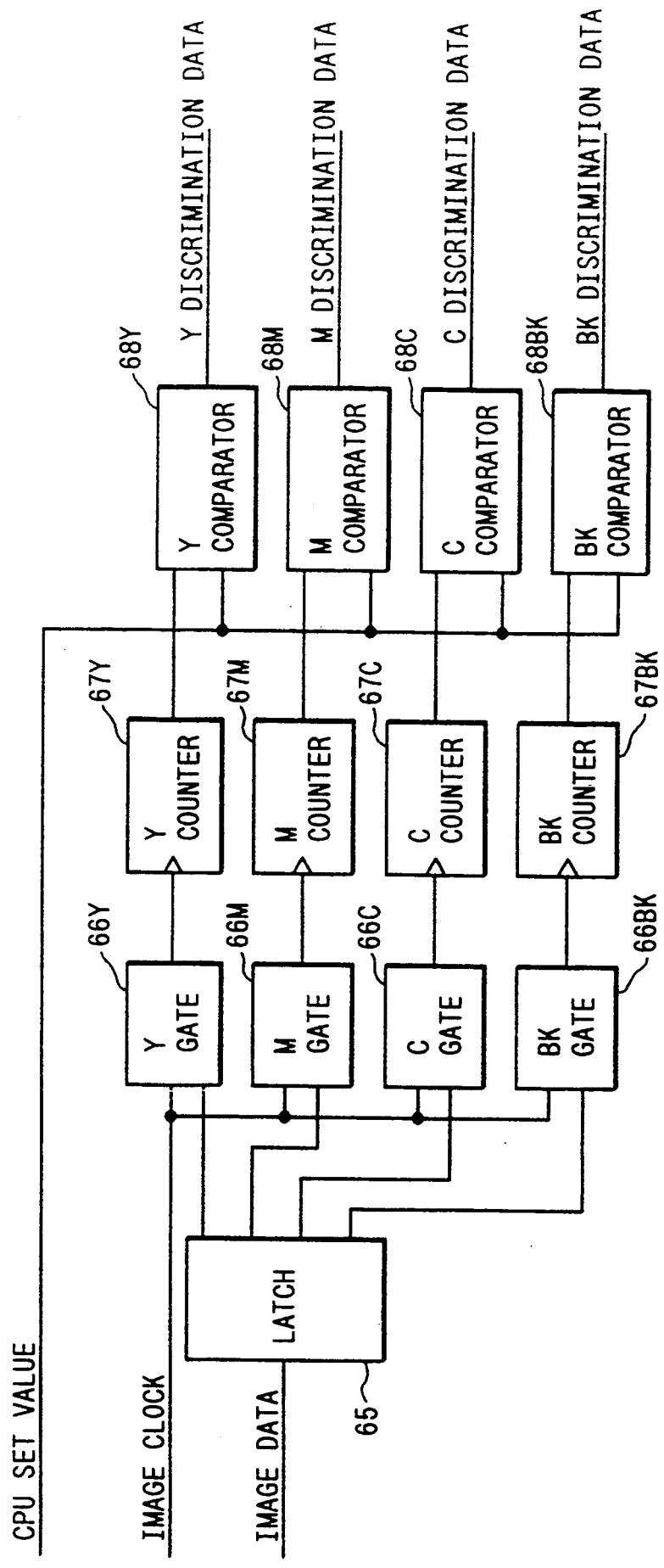
FIG. 4 is a block diagram showing a circuit construction of color-in-use determining means in an embodiment of the invention.

FIG. 4 shows a specific construction of the color-for-use determining means. Binary image data read out from hard disk 60 is supplied to latch 65 for separating component data Y, M, C and Bk. These data on-off control respective gates 66Y, 66M, 66C and 66Bk to control image clock output. That is, if binary image data supplied to gates 66Y, 66M, 66C and 66Bk are "1" (i.e., provision of ink), these gates provide image clock. Counters 67Y, 67M, 66C and 66Bk count the respective gate outputs, i.e., count pixels where the binary image data is "1" (provision of ink). The count is compared to a preset value in the CPU. If the count is the present value or more, a judgement for color-for-use is given, while if the count is less than the preset value, a judgement for color-not-for-use is given. The preset value in the CPU is 10, for instance.

The above construction of the color-for-use determining means is by no means limitative. For example, where received data is not given as data R, G and B or as data Y, M, C and Bk but is given as separate density and color hue data such as data L*, a* and b*, determination of these data may be executed prior to extension of data a* and b* in extension processing circuit 128.

Designated at 62 is a mode checking means for checking whether receiving mode is monochromatic or color. Designated at 63 is image converting means for converting color image data into monochromatic image data by extracting the extent of shade of the color image data. Designated at 64 is a monochromatic print switch, which is operated when it is desired to effect forced recording in black ink of data in color receiving mode.

Designated at 108 is a color CCD (charge-coupled device) serving as image sensor means of original reading system. Color CCD 108 converts original image focused through a focusing lens such as a rod lens into an electric signal. Designated at 109 is a binarizing circuit for binarizing given color image data for each color component. Designated at 114 is a console having a key board and so forth. An operating panel of the console has liquid crystal display (LCD) 115 and various keys 116. Designated at 117 is a DMA controller for controlling data transfer between hard disk 60 and individual image memories 107Bk, 107C, 107M and 107Y according to command from CPU 101.

Designated at 120 is a color-to-monochromatic image conversion circuit for converting color image signal read out by color CCD 108 into monochromatic image data. For example, when image data obtained from color CCD 108 consists of three color components R, G and B, circuit 120 converts this image data into data Y given as $Y=0.6G+0.3R+0.1B$ or extracts sole component G. Designated at 122 is a binarizing circuit binarizing the output of conversion circuit 120 through a binarizing processing based on an error diffusion process, a dither process, an average density preservation process, etc. Designated at 124 is a color image processing circuit for performing such processing as color balance control, color masking and VCR on color image data output of color CCD 108 for conversion to four components Y, M, C and Bk. Designated at 128 is a compression/extension processing circuit for compressing and extending the output of color image processing circuit 124 or data stored in hard disk 60. For example, circuit 128 compresses or conversely extends binary image data, for instance, through such processing as run length coding, forecast coding or entropy coding. Designated at 200Bk, 200C, 200M and 200Y are drive circuits for driving absorbing pumps for recovery of the heads for Bk, C, M and Y. These drive circuits are provided for the individual ink colors. Designated at 201Bk, 201C, 201M and 201Y are motors for the absorbing pumps.

Operations of this embodiment of the apparatus will now be described.

Recovery processing

There are two different procedures of recovery processing for preventing the clogging with ink in the recording apparatus, i.e., "idle discharge" which is comparatively easily performed and "withdrawal discharge" which is performed for regular recovery.

Idle discharge

Forced discharge of ink without aim of printing is effected from all the nozzle of recording head 20 shown in FIG. 3 toward cap unit 26A by moving head 20 to the position corresponding to cap unit 26A by driving drive motor 17 and applying like drive pulse to all heat generators in the nozzles of head 20. At this time, it is not necessary to cover (or cap) head 20 with cap unit 26A. The discharge is effected with cap unit 26A at a position spaced apart from head 20, and ink discharged into cap unit 26A is recovered into recovery unit 26.

Withdrawal discharge

Like the idle discharge as above, recording head 20 is brought to a position facing cap unit 26A, and then cap unit 26A is brought to cover head 20 with advancement of recovery unit 26 caused by driving motor 22. Then, ink in the nozzle is withdrawn by driving a withdrawal motor (not shown) in recovery unit 26. Even when clogging of the nozzle is not removed with idle discharge, the head can be recovered by having resort to withdrawing force of the withdrawal motor in recovery unit 26.

Printing of non-discharge detection pattern

Figure 6:
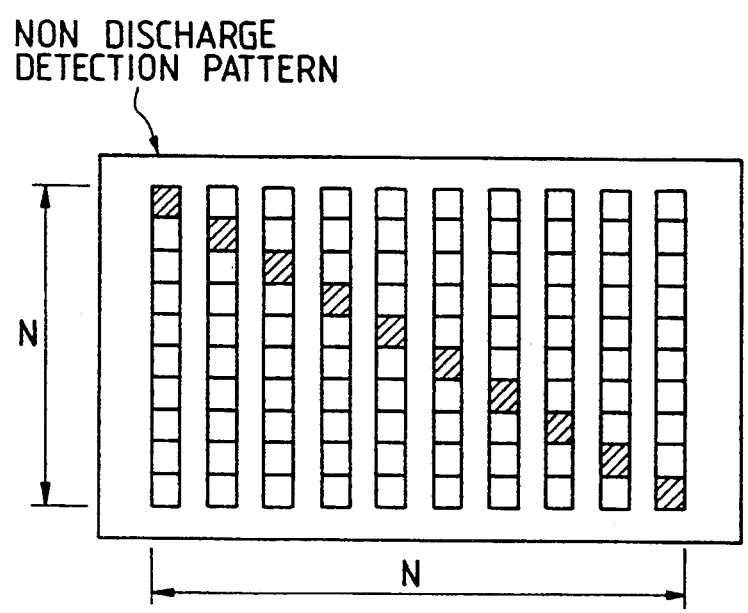
FIG. 6 is a view for explaining an example of non-discharge detection pattern printed at the time of non-discharge detection.

FIG. 6 shows an example of non-discharge detection pattern which is recorded at the time of non-discharge detection. In this pattern, shown shaded are ink positions obtained as a result of ink discharge executed sequentially for each of the nozzles of head 20 toward non-discharge sensor 120 from upper nozzles by moving carriage 16 along guides 19A and 19B to the right in the Figure. Labeled N is the number (integral number) of nozzles. The illustrated non-discharge detection pattern is by no means limitative. For example, a plurality of successive times of discharge may be executed from the same nozzle, or discharge may be executed once for each of a plurality of nozzle groups, into which all the nozzles are divided. In the latter case, non-discharge may be determined by checking whether the average density among the individual groups is uniform.

Further, in the present embodiment of the invention, the non-discharge detection pattern is directly recorded on recording paper. Alternatively, it is possible to provide a non-discharge detection portion, for instance exclusive paper, separately from recording paper and within the range of movement of the head carriage. In this case, the non-discharge check may be executed without contaminating the recording paper for recording image. In this embodiment, the recording paper is utilized for simplification of the apparatus. More specifically, roll paper is used, and a portion of paper used for non-discharge detection is subsequently cut away.

Example of control operation for non-discharge check

Now, a control operation for non-discharge check in the embodiment of the invention will be described with reference to the flow chart of FIG. 7. CPU 101 controls such that drive motor 17 is first driven to bring recording head 20 to the position of cap unit 26A for execution of idle discharge, i.e., forced discharge of ink without aim of printing, about 10 times with drive pulse impression on all the nozzles of head 20 (step S11). Then, recording paper is set. More specifically, the roll paper is paid off to provide a new paper surface by driving the motor (step S12). Subsequently, head 20 is moved to a position of non-discharge pattern detection by agency of drive motor 17 and carriage 16 (step S13). Then, count n of an internal counter is set to "0" (step S14).

Then, a check is done as to whether number N of the last one of the nozzles of head 20 is reached by count n. If the result of the check is "NO", discharge from n-th nozzle (from 0-th nozzle) is caused with drive pulse impression thereon (step S16). Then, count n of the internal counter is incremented by "1" (step S17), and then head 20 is moved by one pitch with driving of drive motor 17 (step S18). The routine then goes back to step S15 noted above, and the above operation sequence is repeated until n=N. Subsequently, head 20 is moved to a position of non-discharge detection by agency of drive motor 17 and carriage 16.

When ink is discharged from the last nozzle of head 20, a non-discharge detection pattern as shown in FIG. 6 is printed on the non-discharge detection surface of non-discharge detection unit 120. The pattern shown in FIG. 6 applies to a case when there is no non-discharge from any of the orifices. If it is found in step S15 that n=N, i.e., if the result of check is "YES", non-discharge detection sensor 113 is moved to the non-discharge detection position, i.e., position, at which the non-discharge detection pattern is printed, by moving the carriage (step S20). Then, count n of the internal counter is set to "0" (step S21).

Subsequently, whether the number N of the last one of the nozzles of head 20 is reached by count n of the internal counter is checked (step S22). If the number has not been reached yet, one line, i.e., n-th line, is read out through non-discharge detection sensor 113 (step S23). If the line is found to be entirely white, i.e., if no discharge of ink is detected (step S24), a message of detection of non-discharge is given to main CPU 101 (step S28). This notice may be effected by changing the value of a predetermined flag.

If it is determined in step S24 that the line is not entirely white, count n of the internal counter is incremented by "1" (step S25), and then non-discharge detection sensor 113 is moved by one pitch (step S26). The routine then goes back to step S22, and the above operation sequence is repeated.

The sequence of steps S22 through S26 is repeated until it is found in step S22 that the number N is reached by count n. This takes place when and only when ink is discharged normally from all the nozzles. Thus, at this time a message of non-detection of non-discharge is given (step S27). This notice, like the above case, may be given by changing the value of a predetermined flag.

In the foregoing, the basic sequence of non-discharge check has been described. When this routine is executed for the individual colors, it is ready to perform recording in color recording mode.

In the embodiment shown in FIG. 1, non-discharge is informed to the CPU as soon as non-discharge is detected even in a single place, this is by no means limitative. For example, it is possible to determine the number of places of non-discharge.

Overall operation

Figures 12, 12A:
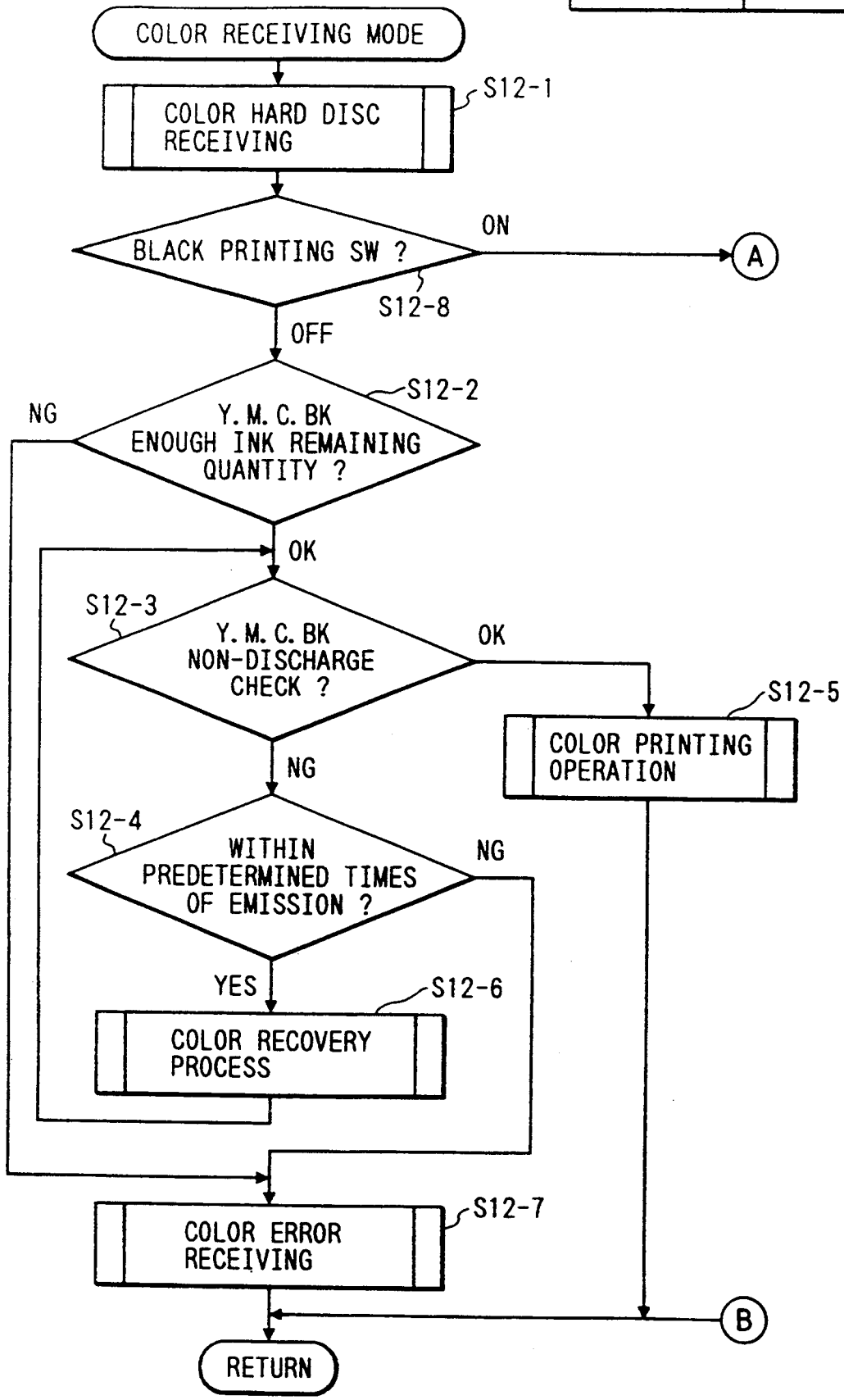
FIG. 12 is a flow chart for explaining a sub-routine color receiving mode shown in FIG. 11.
Figure 12B:
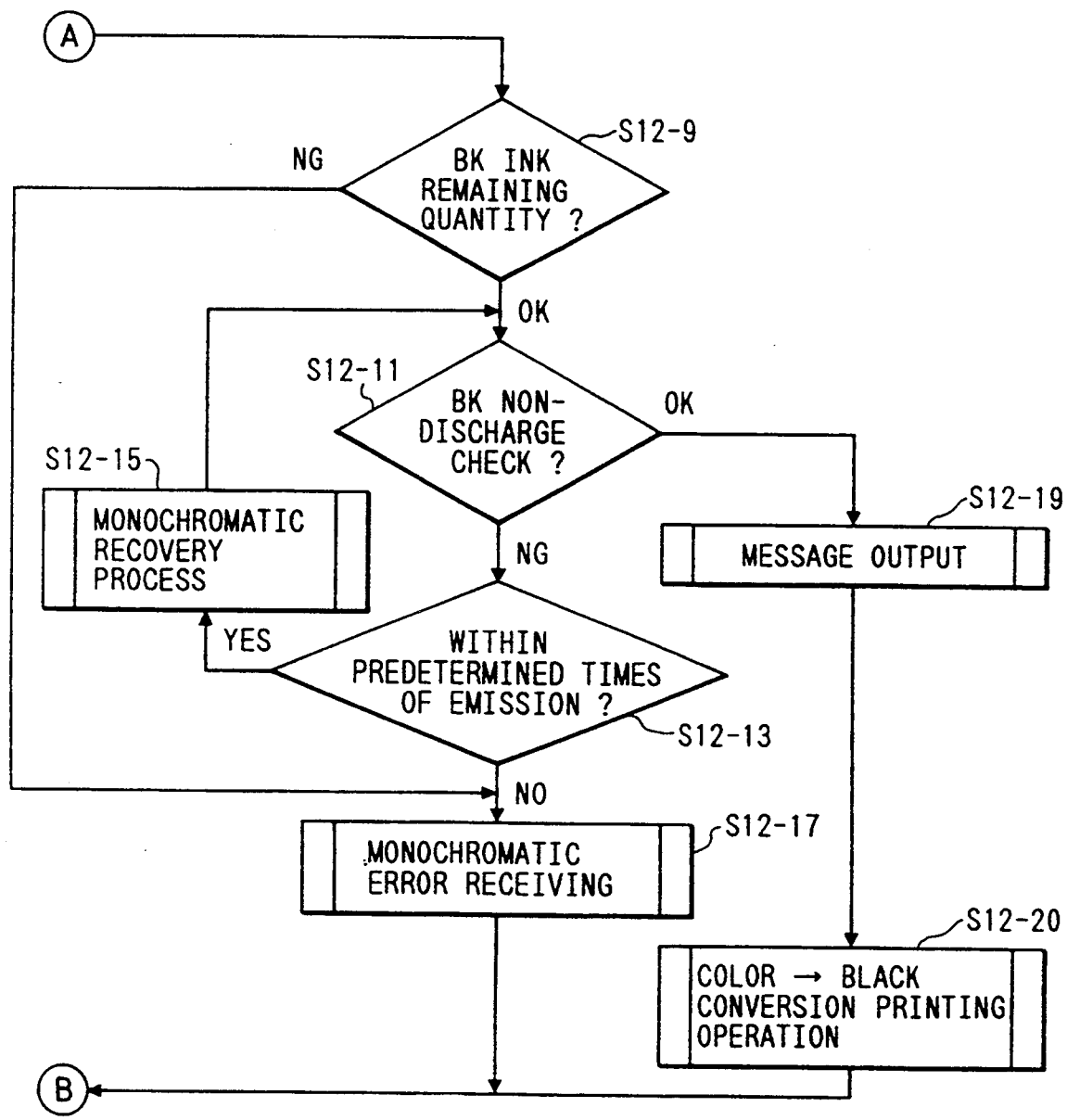

Now, a color receiving mode will be described with reference to FIG. 12, and a monochromatic receiving mode will be described with reference to FIG. 13.

In the color receiving mode, color hard disk reception is performed, that is, received color image data is stored in the hard disk without complete extension in circuit 128 (step S12-1). That is, transmitted image data is preserved in hard disk 60. The image data which is preserved in the hard disk may not be completely extended but may be partly extended through development to intermediate code, for instance.

Subsequently, whether black printing switch 64 is "on" is checked (step S12-8). If the result is "NO", a remaining black ink quantity check (step S12-9) and non-discharge check (step S12-11) are executed for black ink. If the result of the non-discharge check is "NO", a message of the "on" state of the black printing switch or start of black printing is given (step S12-19). Then, a color-to-monochromatic conversion printing operation as will be described later in detail is performed (step S12-20). If the non-discharge check in step S12-11 yields "NG", a monochromatic recovery process (step S12-15) is executed, that is, idle discharge and/or withdrawal discharge of the black ink head is executed, and then step S12-11 to be described later is executed once again. If this check yields "NG", monochromatic error reception (step S12-17) as will be described later is performed. If it is found in step S12-8 that the switch is "off", the following process is executed.

First, the remaining ink quantity in IJC for each of colors Y, M, C and Bk is checked (step S12-2). If the ink quantity is enough for all the four colors, non-discharge check is executed for each of four colors Y, M, C and Bk (step S12-3). If ink is not enough for even a single color among the four colors, color error reception (step S12-7) as will be described later is performed. If it is found in the non-discharge check in step S12-3 that the remaining ink quantity is enough for all of four colors, Y, M, C and Bk, a color printing operation is performed (step S12-5). If even a single head among the four heads for the respective colors has a non-discharge nozzle, the number of times of recovery process executed is checked (step S12-4). If the number is within a predetermined number, a color recovery process is executed (step S12-6). The routine then goes back to step S12-3 to repeat the above operation sequence. If there is a head having a non-discharge nozzle after exceeding of the predetermined number by the number of times of execution of the recovery process, color error reception is performed in step S12-7.

The color recovery process in step S12-6 noted above is to execute idle discharge and/or withdrawal discharge with respect to the four heads for respective colors Y, M, C and Bk.

Figure 13:
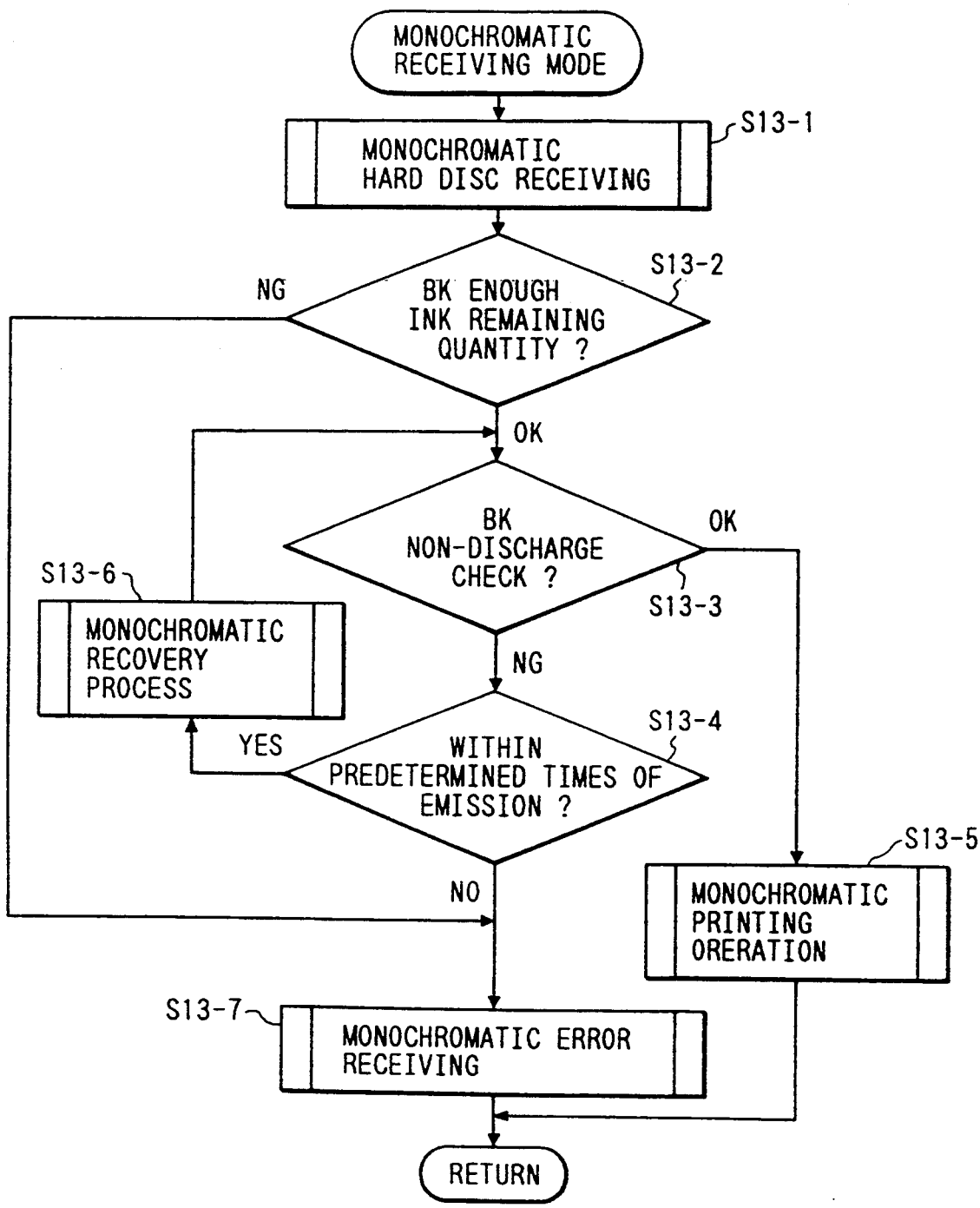
FIG. 13 is a flow chart for explaining a sub-routine color receiving mode shown in FIG. 11.

In the monochromatic receiving mode, as shown in FIG. 13 monochromatic hard disk reception (step S13-1) is performed to preserve transmitted image data in hard disk 60. Then, the remaining ink quantity in IJCBk is checked (step S13-2). If the result of check is "OK", non-discharge check for black ink is executed (step S13-2). If the result is "OK", non-discharge check (step S13-3) is executed for black ink. If ink is not enough, monochromatic error reception as will be described later is executed (step S13-7). If the result of the non-discharge check for black head in step S13-3 is "OK", monochromatic printing operation is performed (step S13-5). If there is a non-discharge nozzle, the number of times of recovery process execution is checked (step S13-4). If the number is within a predetermined number, monochromatic recovery process (step S13-6) is executed. The routine then goes back to step S13-3, and the above sequence is repeated. If there is a non-discharge nozzle after exceeding of the predetermined number by the number of times of recovery process execution, monochromatic error reception in step S13-7 is executed.

The monochromatic every process in step S13-6 is to execute idle discharge and withdrawal discharge for the black head.

Alternatively, both idle discharge and withdrawal discharge may be executed for the black head.

Figure 14:
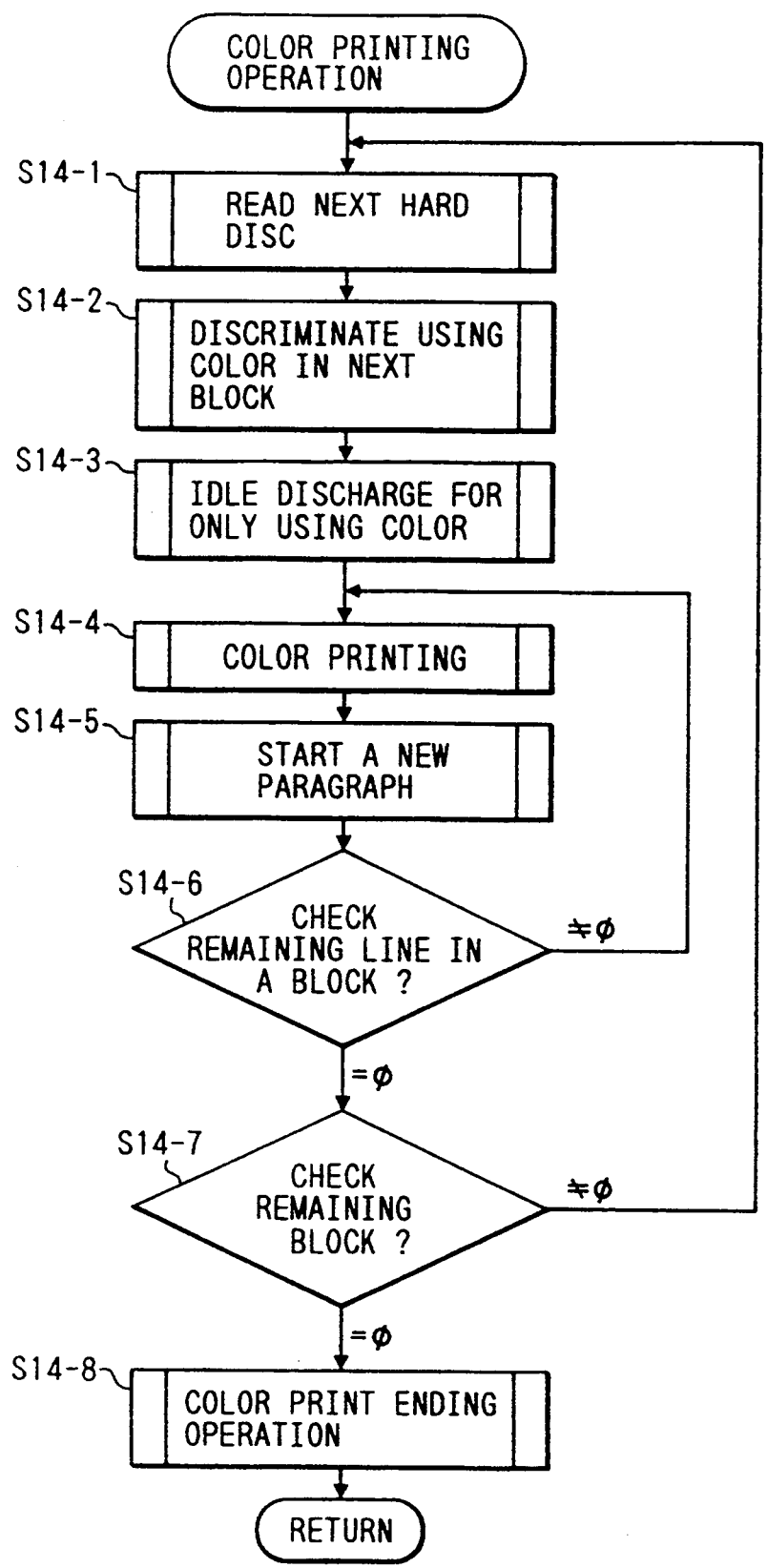
FIG. 14 is a flow chart for explaining a sub-routine color printing operation shown in FIG. 12.
Figure 15:
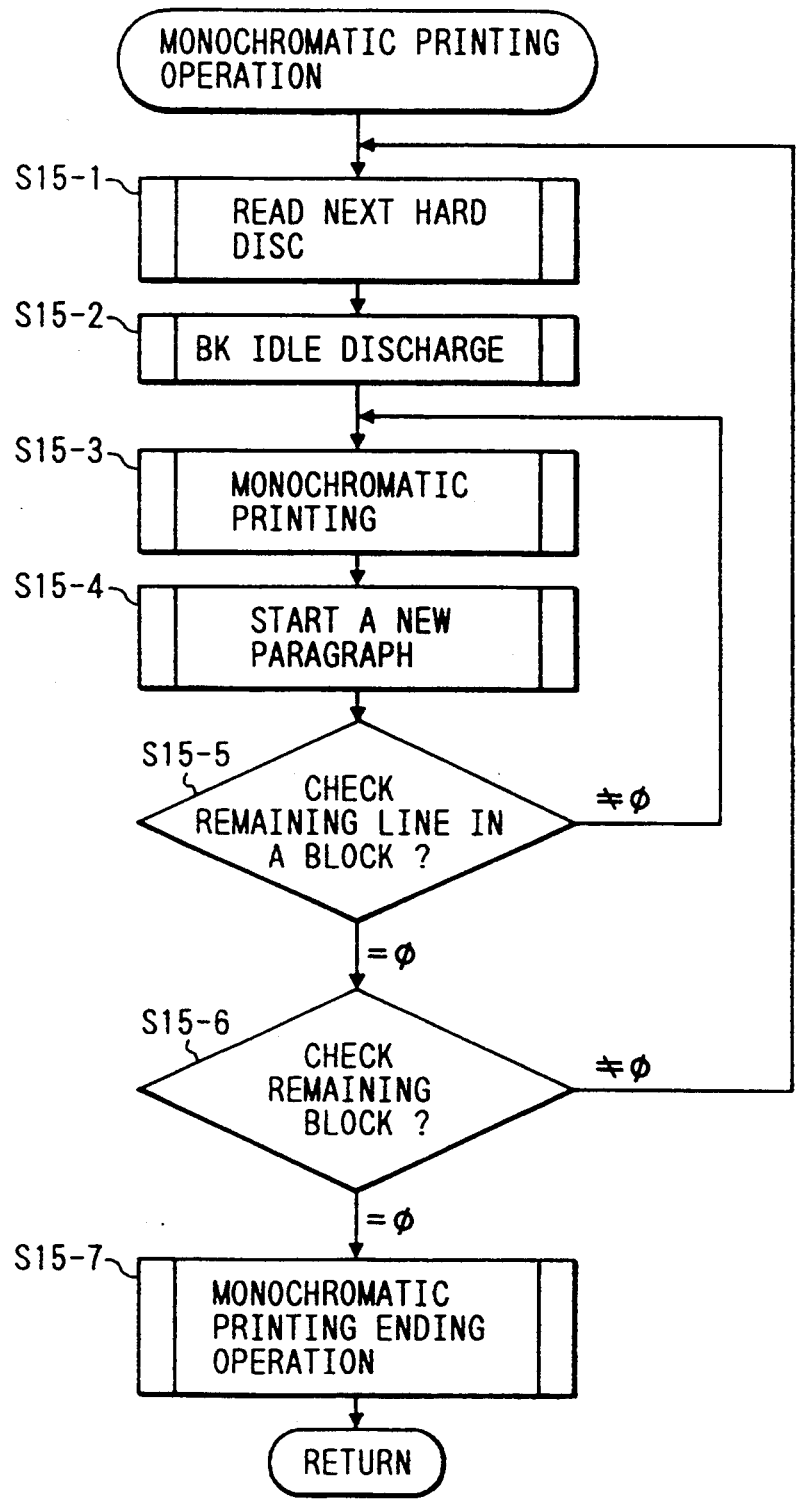
FIG. 15 is a flow chart for explaining a sub-routine monochromatic printing operation shown in FIG. 13.

Now, color printing operation will be described with reference to FIG. 14, and then monochromatic printing operation with reference to FIG. 15.

The color printing operation will now be described. Data preserved in hard disk 60 is read out and subjected to extension in compression/extension processing circuit 128. In this embodiment, image data for individual colors Y, M, C and Bk are read out for each block noted before, i.e., for every eight lines. The individual color image data read out are stored in respective Y, M, C and Bk image memories 107Y, 107M, 107C and 107Bk (step S14-1). The reading of data for every eight lines is by no means limitative, and it is possible to permit line-by-line data reading. In addition, the extension may be executed in real time operation while performing printing, or it may be executed for the whole frame at a time. In this embodiment, at this time color-for-use determining means 61 which is described before using FIG. 4 determines colors to be used among colors Y, M, C and Bk for the next block (step S14-2), and idle discharge or withdrawal discharge is executed only for the heads of the colors to be used (step S14-3). Subsequently, line color printing (step S14-4) and starting new line (step S14-5) are executed while image data is read from image memories 107Y, 107M, 107C and 107Bk. The above sequence is repeated until the number of remaining lines in the block becomes zero (step S14-6), that is, processing for eight lines is repeated.

Now, the distance, by which head carriage 16 is moved in the direction of arrow 40 in FIG. 3 for line color printing, will be described.

As noted earlier, for recording color image over the entire width of paper the position of the carriage at the start of line color printing is such that black ink head 20Bk faces the leading end of paper, and the carriage position at the end of line color printing is such that yellow ink jet head 20Y faces the trailing end of paper. In other words, head carriage 16 reciprocates the start and end positions noted above, and effects printing only while it is moved in the direction of arrow 40. For causing such movement of head carriage 16, CPU 101 provides a command to a control circuit for controlling the state of driving of drive motor 17.

When the number of remaining lines in block becomes zero, the number of remaining blocks which have not yet been printed is checked (step S14-7). If the number is not zero, the routine goes back to step S14-1 to repeat the above sequence. If the number of remaining blocks is equal to zero, a color print ending operation (step S14-6) as will be described later is executed.

Now, monochromatic printing operation will be described. Black image data preserved in hard disk 60 is read out block by block and stored in image memory 107Bk (step S15-1). Then, idle discharge is executed for the black ink head (step S15-2). Then, line monochromatic printing (step S15-3) and starting new line (step S15-4) are executed while reading out image data from image memory 107Bk. The above sequence is repeated until the number of remaining lines in block becomes zero (step S15-5).

Now, the distance, by which head carriage 16 is moved in the direction of arrow 40 for line monochromatic printing, will be described.

As noted earlier, for recording monochromatic image over the entire paper width the carriage position at the time of start of line monochromatic printing is such that black ink jet head 20Bk faces the leading end of paper. That is, head carriage 16 reciprocates the start and end positions noted above and effects printing only while it is moved in the direction of arrow 40. Thus, printing is done quickly, and also the like of the apparatus can be improved.

When the number of remaining lines in block becomes zero, this is detected by CPU 101. This detection is effected according to the amount of data printed after being read out from hard disk 60. Then, the number of remaining blocks is checked (step S15-6), and if it is not zero, the routine goes back to step S15-1 to repeat the above sequence. If the number of remaining blocks is zero, a monochromatic print ending operation as will be described later is performed (step S15-7). When the remaining block number becomes zero, this is detected by CPU 101 from the output of compression extension processing circuit 128.

Figure 16:
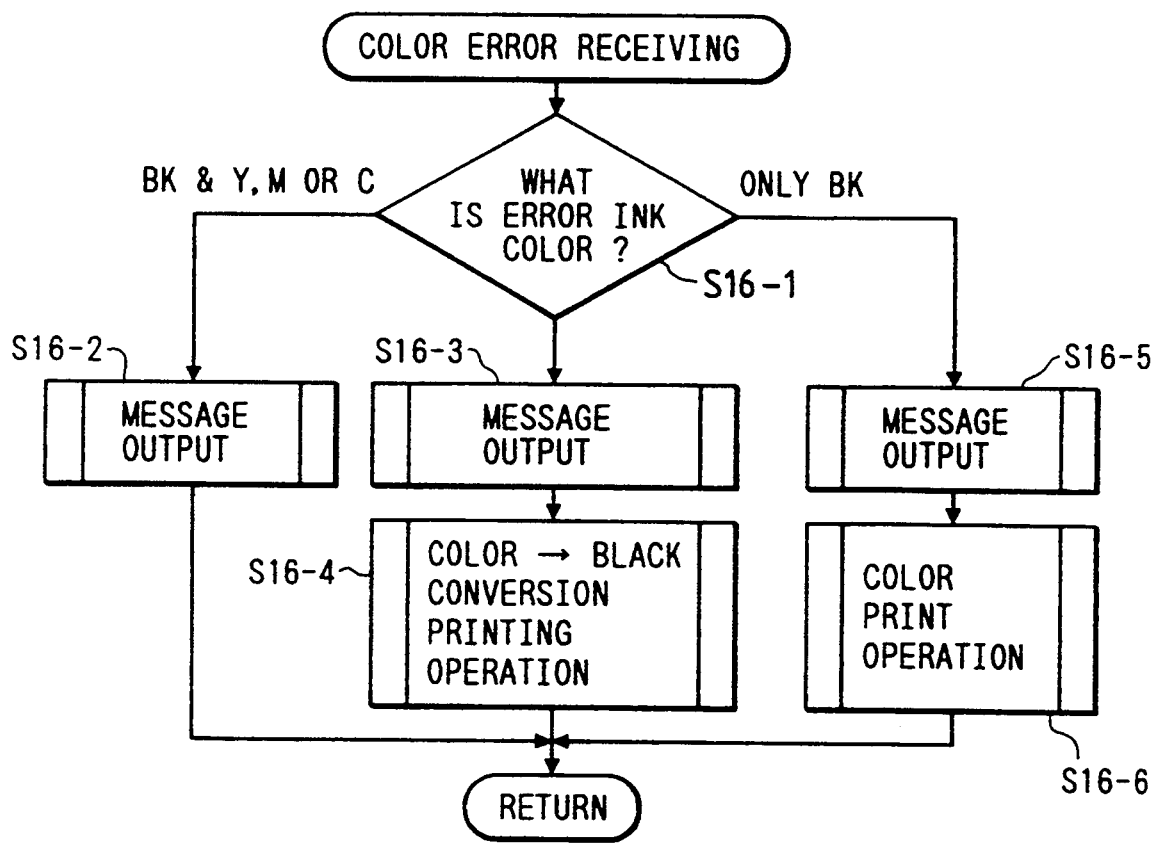
FIG. 16 is a flow chart for explaining a sub-routine color error reception shown in FIG. 12.
Figure 17:
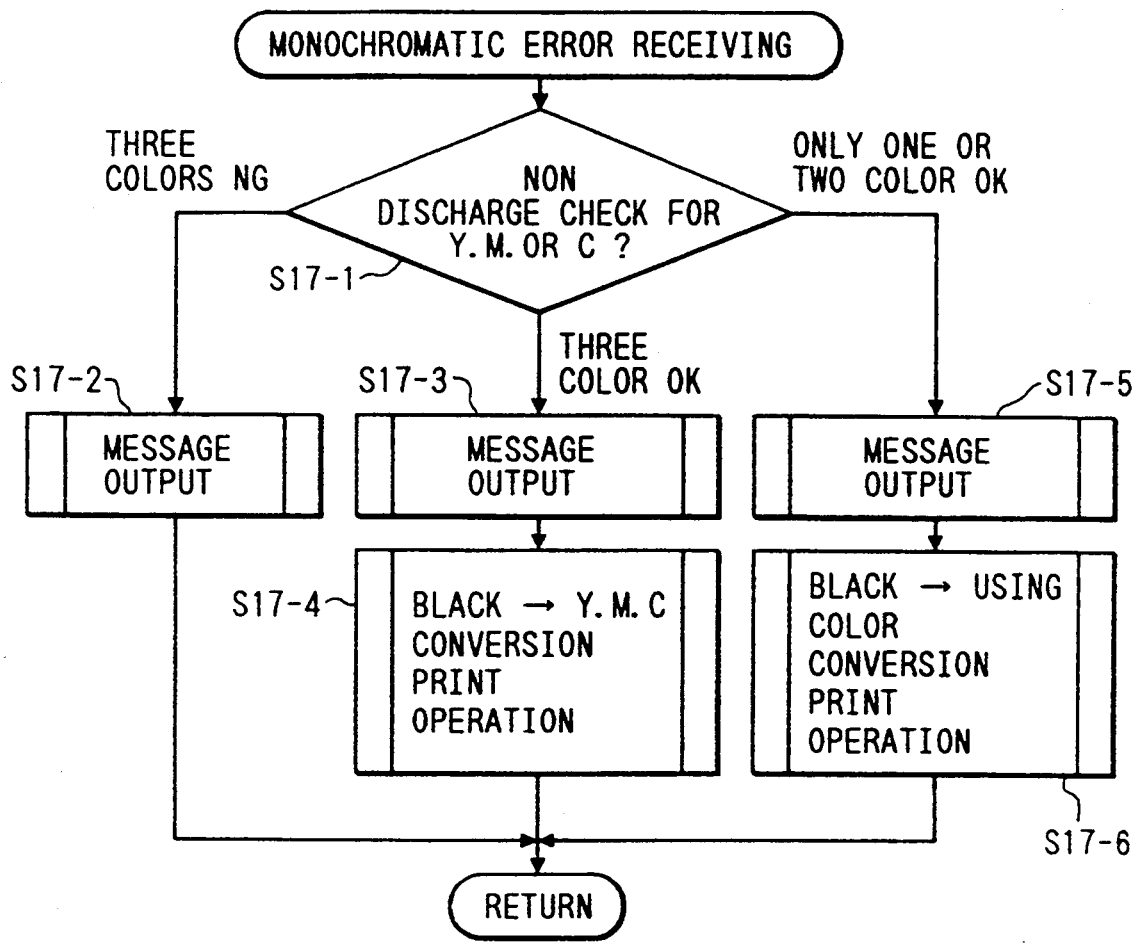
FIG. 17 is a flow chart for explaining a sub-routine monochromatic error reception shown in FIG. 13.

Now, color error reception will be described with reference to FIG. 16, and monochromatic error reception with reference to FIG. 17.

As noted above, the color error reception is effected if ink is insufficient in even a single IJC among those for four colors Y, M, C and Bk or if there is a non-discharge nozzle of even a single one of the four colors. Accordingly, a check is done for a color of IJC for which there is ink shortage or non-discharge (hereinafter the color being referred to as trouble ink color) (step S16-1). The subsequent operation is determined by the result of this check. More specifically, if at least one color among colors Bk, Y, M and C is black and normal, a message for printing trouble color and color image after conversion to monochromatic is displayed on LCD 115 (step S16-3) for color-to-black conversion printing operation (step S16-4).

If sole black is the trouble ink, black ink trouble is displayed on LCD 115 (step S16-5), and then color printing operation noted above is performed (step S16-6).

Next, monochromatic error reception will be described with reference to FIG. 17. As noted above, monochromatic error reception is done if and only if there is ink shortage or a non-discharge nozzle in IJCBk. However, no check has been done for IJCs of three colors Y, M and C. Therefore, whether these IJCs can be used is checked. To this end, non-discharge check is done for IJCs of three colors Y, M and C (step S17-1), and the following operation is determined according to the result of check.

More specifically, if all three heads for Y, M and C have non-discharge nozzles, a message of trouble in all four colors Y, M, C and Bk is displayed on LCD 115 (step S17-2). If the three heads for Y, M and C can all be used, a message of black ink trouble and printing of black with Y, M and C is displayed on LCD 115 (step S17-3), and black-to-YMC conversion printing operation as will be described later is performed (step S17-4). If one or two of the heads for Y, M and C can be used, a message of black ink trouble and printing black by conversion thereof to a color capable of use is displayed on LCD 115 (step S17-5), and black-to-color-for-use conversion printing operation is performed (step S17-6). If two colors can be used at this time, the priority of determining a color for use is in the order of M, C and Y.

Now, the color-to-black, black-to-YMC and black-to-color-for-use conversion printing operations noted above will be described with reference to FIGS. 18 to 20, respectively.

First, color-to-black conversion printing operation will be described. First, image data for individual colors Y, M, C and Bk preserved in hard disk 60 are read out block by block as noted above and extended in circuit 128 for storing in Y, M, C and Bk image memories 107Y, 107M, 107C and 107Bk for respective colors (step S18-7). Then, Y, M and C color image data is read out for pixel by pixel from image memories 107Y, 107M and 107C, and Y, M and C image data are converted in image conversion means 63 into black image data for storage in image memory 107Bk (step S18-2).

Means for converting color image data into black image data is not particularly described, but it is possible to obtain conversion by multiplying Y, M and C by a predetermined factor and adding together the products, or it may be obtained by taking out sole magenta data. In general, any means may be used so long as color image is digitally converted to density image data.

The subsequent operation is entirely the same as step S15-2 and following steps in the monochromatic printing operation described before in connection with FIG. 15.

Now, black-to-YMC conversion printing operation will be described with reference to FIG. 19. Black image data present in hard disk 60 is read out block by block and stored, extended and stored in image memory 107Bk (step S19-1).

Then, black image data is read out from image memory 107Bk and transferred through DMA controller 117 to image memories 107Y, 107M and 107C (step S19-2). Data in image memory 107Bk is cleared when the inter-memory transfer operation is ended. Then, the idle discharge operation noted above is executed for the heads of three colors Y, M and C (step S19-3). Subsequent operation is entirely the same as the color printing operation noted above, i.e., step S14-4 and following steps in FIG. 14.

Now, black-to-color-for-use conversion printing operation will be described with reference to FIG. 20. Black image data stored in hard disk 60 is read out block by block and stored in image memory 107Bk (step S20-1).

Then, one of colors that can be used is determined with respect to the condition noted above, and black image data read out pixel by pixel from image memory 107Bk is transferred in the image memory for that color (step S20-2).

At this time, data in image memory 107Bk is cleared at the time of end of the inter-memory transfer operation. Then, idle discharge or widhdrawal discharge noted above is executed for the head for color for use (step S20-3). Subsequent operation is entirely the same as step S14-4 and following steps in the color printing operation shown in FIG. 14.

Figure 18:
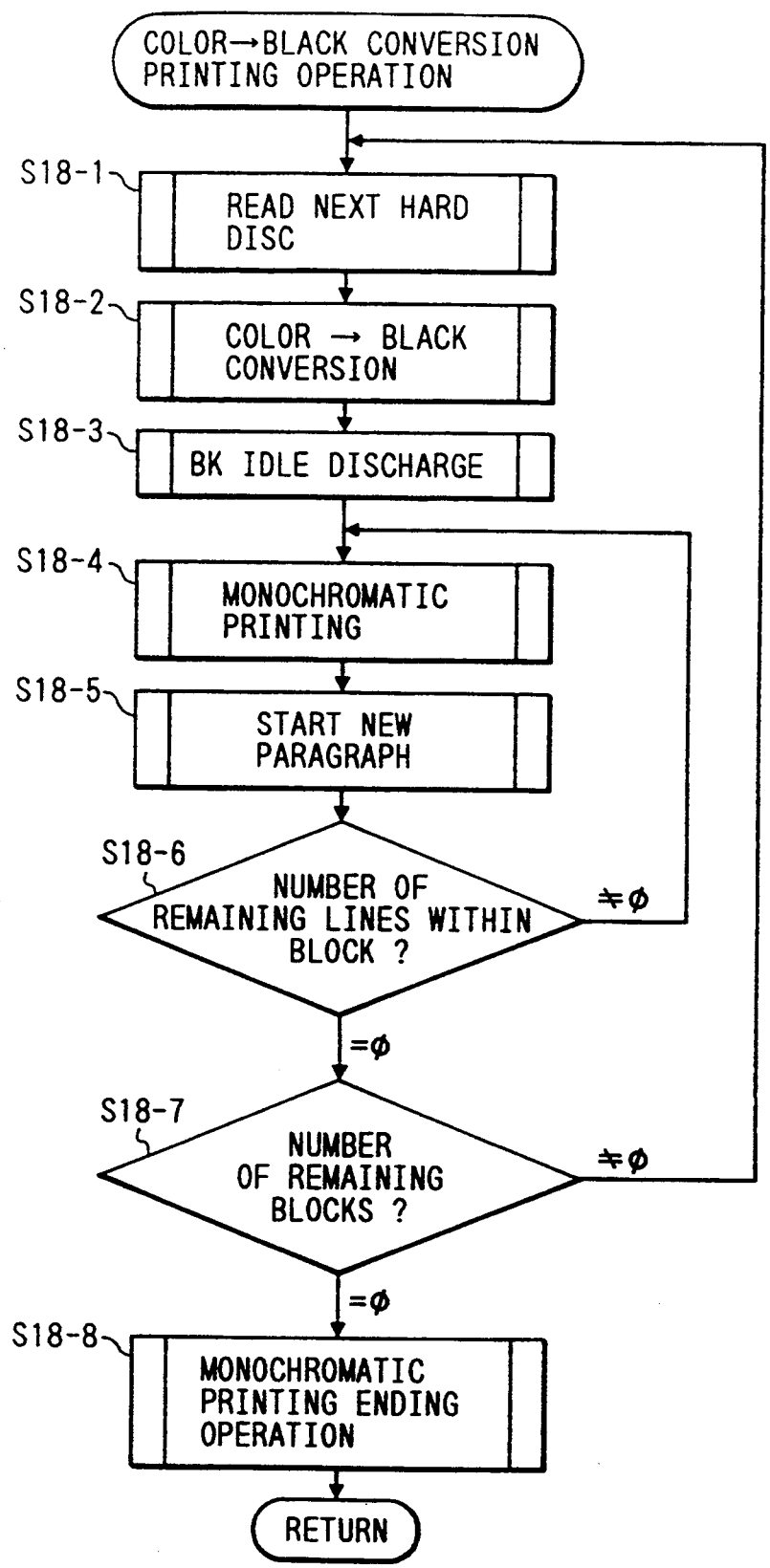
FIG. 18 is a flow chart for explaining a sub-routine color-to-black conversion printing operation shown in FIG. 16.
Figure 19:
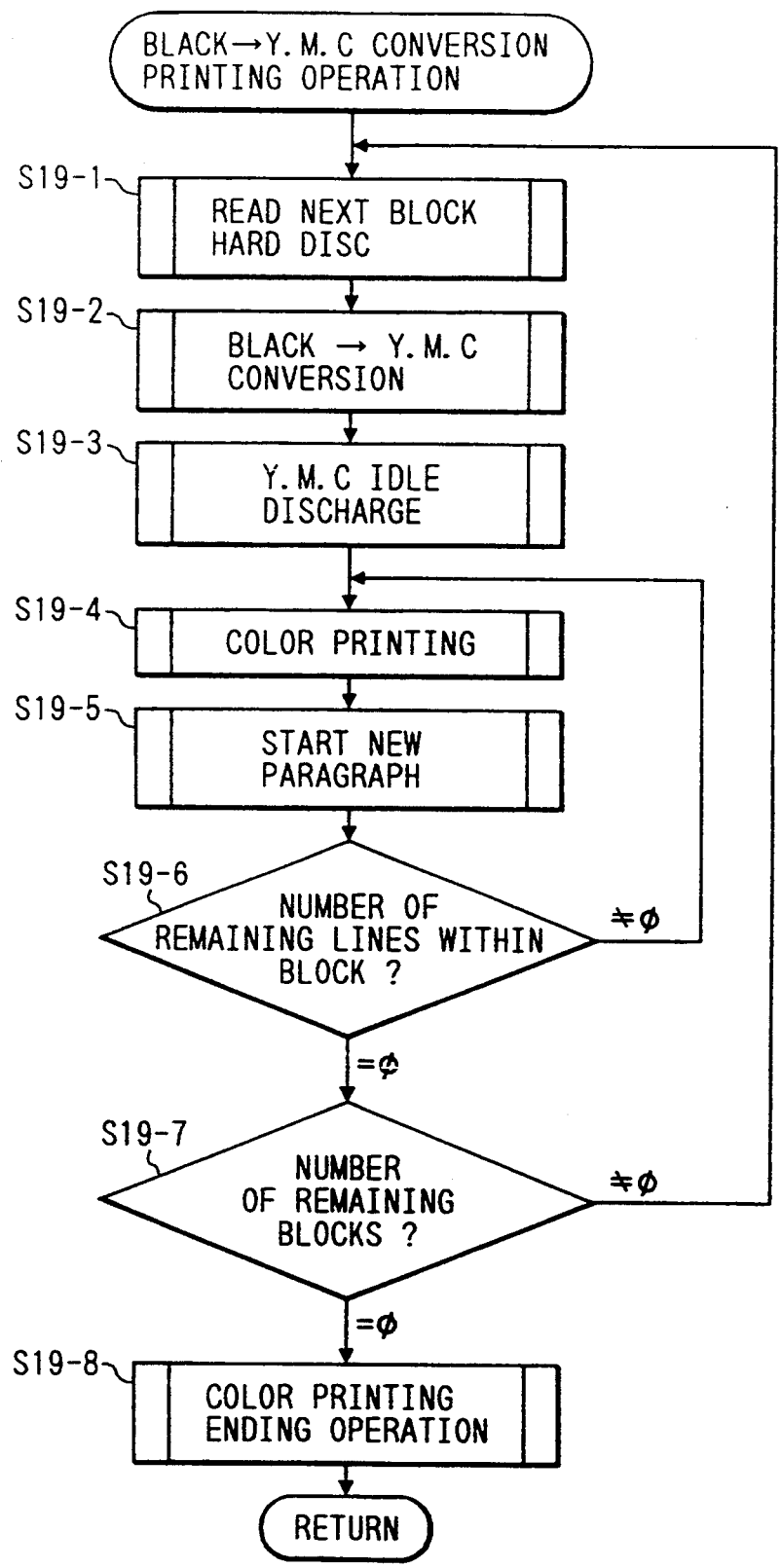
FIG. 19 is a flow chart for explaining a sub-routine black-to-Y,M,C conversion printing operation shown in FIG. 17.
Figure 20:
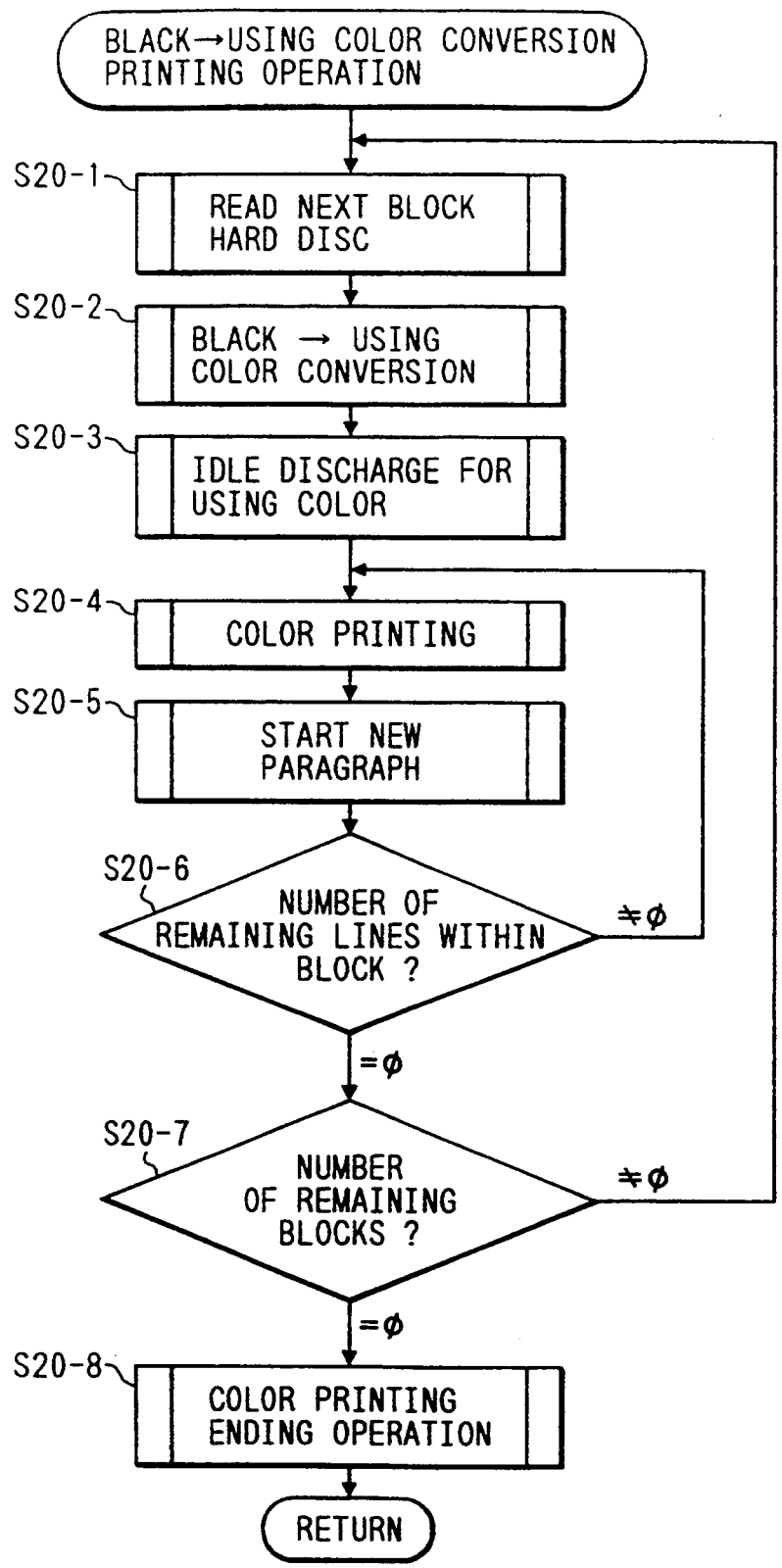
FIG. 20 is a flow chart for explaining a sub-routine black-to-color-in-use conversion printing operation shown in FIG. 17.

Steps S18-3, S19-3 and S20-3 in respective FIGS. 18 to 20 are not particularly necessary in a very initial stage of the color printing and are executed for obtaining more reliable printing operation without print error.

Figure 21:
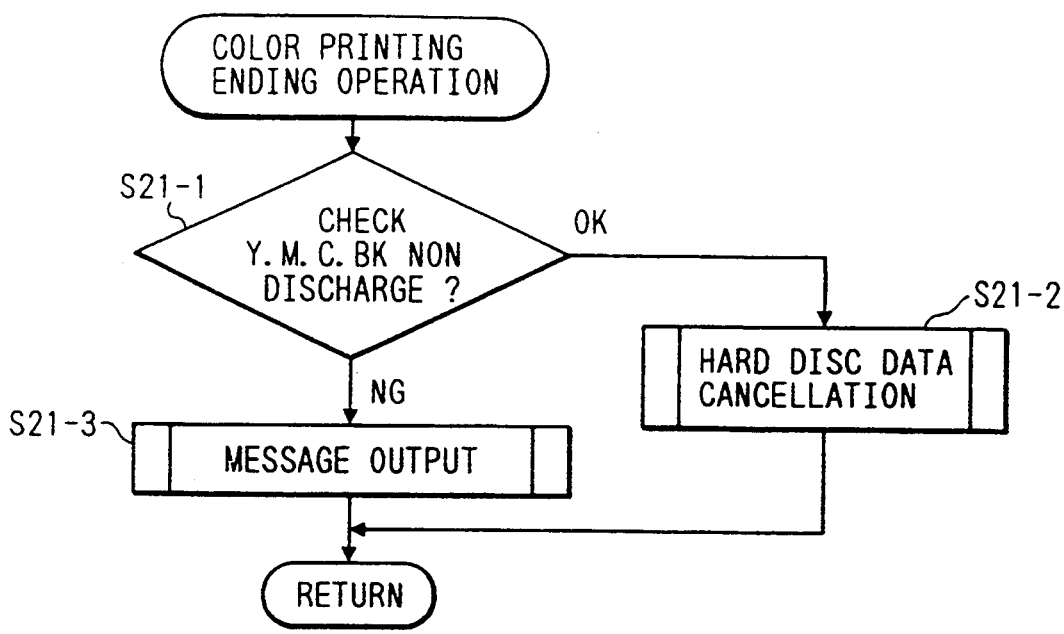
FIG. 21 is a flow chart for explaining a subroutine color print ending operation shown in FIG. 14.
Figure 22:
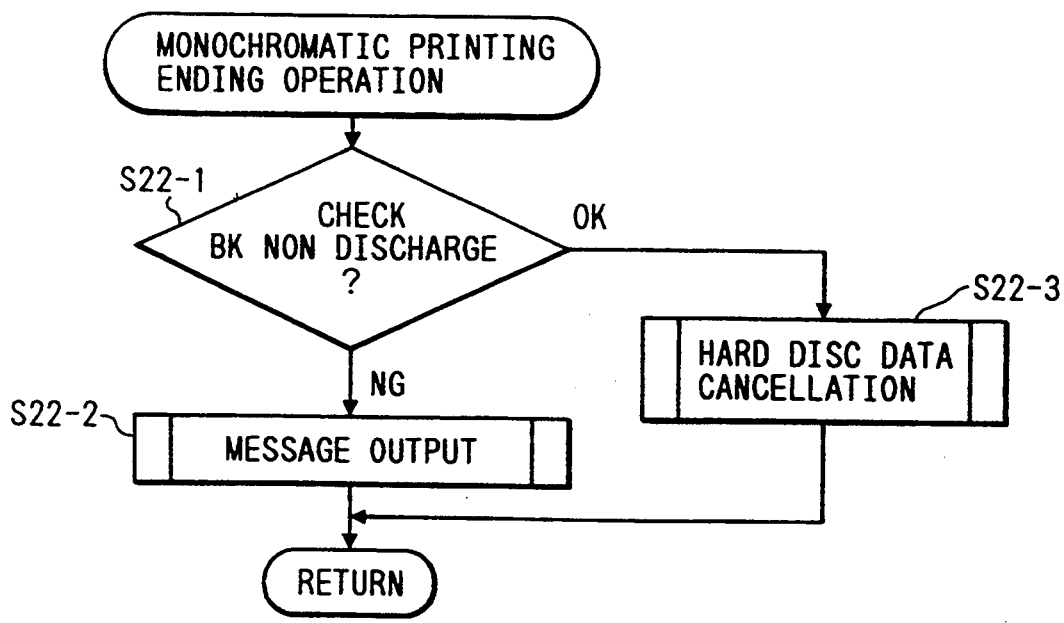
FIG. 22 is a flow chart for explaining a sub-routine monochromatic print ending operation shown in FIG. 15.

Now, the color and monochromatic print ending operations noted above will be described with reference to respective FIGS. 21 and 22.

First, color print ending operation will be described. After the end of printing of one page, the non-discharge check as noted above is executed for four colors Y, M, C and Bk (step S21-1). If the check yields "OK" for all the four colors, it is determined that normal printing could be obtained. Thus, data in hard disk 60 is cancelled (step S21-2), or if next data is received, it is written by overlap writing so that it can no longer be read out. If there is "NG" for even a single color, it is determined that there is a possibility of failure of normal printing. In this case, while holding data in hard disk 60 a message of possibility of defective image is displayed on LCD 115 and is also transmitted to the transmitting side (step 521-3).

In this case, if there is no remaining memory capacity in each of memories 107Y, 107M, 107C and 107Bk or hard disk 60 when next data is received, data in hard disk 60 is held as such for image signal which is not normally printed even by inhibiting the writing of the received data in memory.

Monochromatic print ending operation will now be described. After printing of one page is ended, the non-discharge check is executed for black (step S22-1). If the result of the check is "NG", it is determined that there is possibility of failure of normal printing, and a message of possibility of defective image is displayed on LCD 115 (step S22-2). If the result of the non-discharge check is "OK", data in hard disk 60 is cancelled (step S22-3).

The processing of the data written in memory is the same as in the case described before in connection to FIG. 21.

The present invention is not only applicable to the above serial printer but is also suitably applicable to a facsimile apparatus provided with an ink jet recording apparatus having a full line type recording head having a length corresponding to the width of the largest recording medium capable of recording by the recording apparatus shown in FIG. 8.

Referring to FIG. 8, designated at 201A and 201B are pair rollers for feeding recording medium R in a pinched state in an auxiliary scanning direction Vs shown by arrow. Designated at 202Bk, 202Y, 202M and 202C are full multiple type recording heads for performing recording in black, yellow, magenta and cyan, respectively, with nozzles arranged over the entire width of recording medium R. These heads are arranged in the mentioned order in the direction of feed of recording medium.

Designated at 200 is a recovery system, which undertakes withdrawal operation from each ink jet head, idle discharge operation therefrom and ink discharge recovery processing such as capping (referred to as discharge recovery processing). In these processings, the system faces the recording heads 202Bk, 202Y, 202M and 202C instead of recording medium R. In this embodiment, the number of times of the discharge recovery processing start can be extremely reduced owing to preliminary heating effected at a suitable timing.

Particularly, since in this embodiment the heads are arranged in the order of C, Y, M and Bk from the bottom of the Figure, in the black receiving operation recovery system 200 first executes recovery operation for the individual heads for Y, M, C and Bk, and then it is moved to a position that only the head for Bk is exposed to paper while the other heads for M, Y and C are not.

Since the heads for M, Y and C thus remain capped, reliability can be improved.

Figure 9:
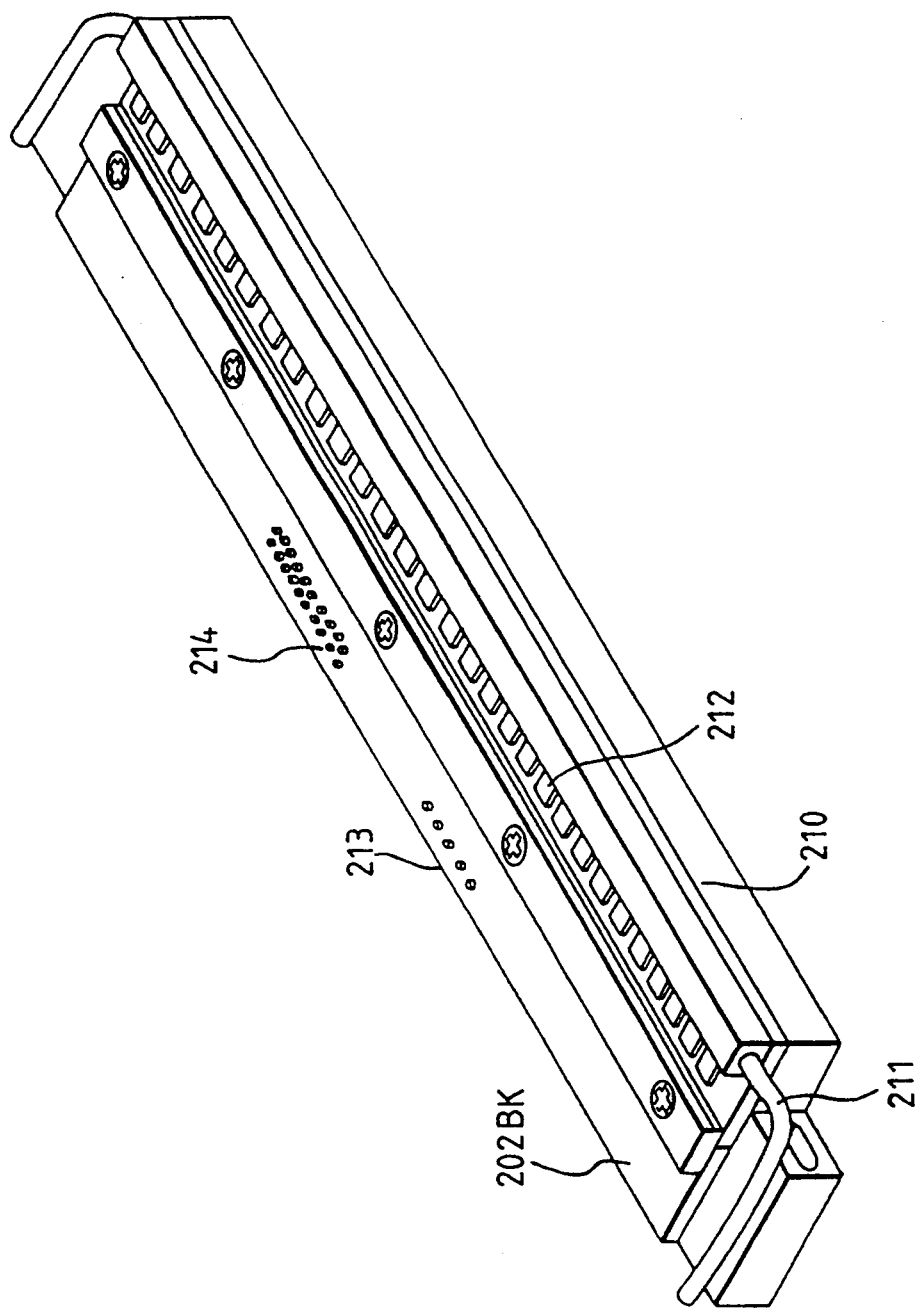
FIG. 9 is an enlarged-scale view showing an essential part of FIG. 8.
Figure 10:
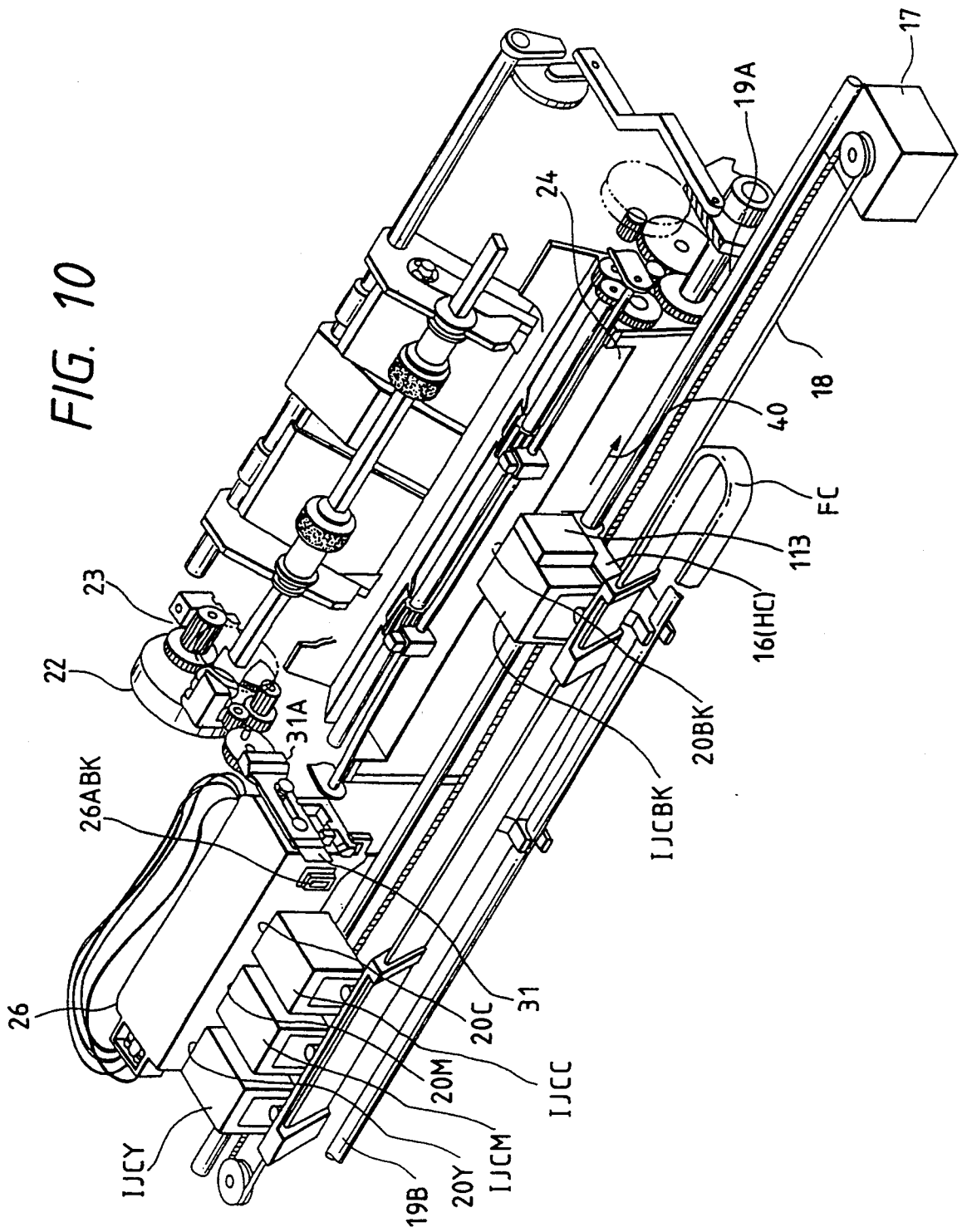
FIG. 10 is a view showing a different example from the construction shown in FIG. 3.

FIG. 9 is a perspective view showing one of recording heads 202Bk, 202Y, 202M and 202C shown in FIG. 8. Referring to FIG. 9, designated at 210 is an ink nozzle, at 211 is an ink supply ductline, and at 212 are a plurality of IC circuits (as drive circuits) for driving electricity-to-heat conversion elements. Designated at 213 and 214 are terminals, to which drive signals are supplied.

The invention is applicable to the facsimile apparatus having such a full line type printer with the same control procedure as described before.

Further while in the embodiment of FIG. 3 the color ink heads and black ink head are mounted on the same carriage, this is by no means limitative. For example, the invention is similarly applicable to a case as shown in FIG. 1, in which color ink heads are mounted on a carriage separate from a black ink head carriage.

Further, the invention is applicable as well to a facsimile apparatus having a recording system consisting of a commonly termed piezoelectric ink jet recording apparatus using piezoelectric elements as ink jet energy source.

Applicable Systems

The invention is applicable various recording systems irrespective of coloring materials employed, and particularly provides excellent effects when applied to an ink jet recording system, more specifically, recording head and recording apparatus of bubble jet type. This is so because with this system it is possible to attain increased density and fineness of recording.

Typical structure and principles are suitably based on those described in, for instance, U.S. Pat. Nos. 4,723,129 and 4,740,796. This system is applicable to either commonly termed on-demand type or continuance type. Particularly, it is effective for the on-demand type in that heat energy may be generated in an electricity-to-heat converter disposed in correspondence to a sheet holding ink or an ink path by impressing on the converter at least one drive signal corresponding to recording information and providing for quick temperature rise exceeding nucleate effervescence, thus generating filmy effervescence on the heat-acting surface of the recording head to form bubbles in ink in one-to-one correspondence to the drive signal. With growth and shrinkage of bubbles at least one ink drop is formed with discharge of ink through a nozzle opening. The drive signal is suitably a pulse signal. In this case, growth and shrinkage of bubbles can be obtained adequately to attain ink discharge of excellent response character. The pulse drive signal is suitably those described in U.S. Pat. Nos. 4,463,359 and 4,345,262. Further, more excellent recording can be obtained by adopting conditions shown in U.S. Pat. No. 4,313,124 concerning the rate of temperature rise of the heat-acting surface noted above.

As the structure of the recording head according to the invention which may be used, in addition to a combination structure (of a linear or orthogonal ink path) comprising a nozzle, an ink path and an electricity-to-heat converter, a structure shown in U.S. Pat. Nos. 4,558,333 and 4,459,600 may be used. Further, the effects of the invention are obtainable by adopting structures based on Japanese Patent Application Laid-open No. 59-123670 disclosing a structure, in which a common slit to a plurality of electricity-to-heat converters serve as a nozzle thereof, and Japanese Patent Application Laid-open No. 59-138461 disclosing a structure, in which an opening for absorbing heat energy pressure waves faces a nozzle. This means that according to the invention reliable and efficient recording can be obtained irrespective of the status of recording head.

Further, recovery means and spare or auxiliary means used for the recording head according to the invention are not limited to those described above, and for stable recording it is possible to use, for the recording head, capping means, cleaning means, pumping or withdrawing means, preliminary heating means consisting of an electricity-to-heat converter or a separate heating element or a combination of these elements.

Further, as for the kinds and number of mounted recording heads, only a single head for monochromatic ink may be provided, or a plurality of heads may be provided for a corresponding number of ink kinds different in recording color and/or density.

Further, the ink jet recording apparatus of this embodiment may be used as image output terminal of a data processing apparatus such as a computer or may be a copier combined with a reader or the like or a facsimile apparatus having transmitting and receiving functions.

Further, in communication control unit NUC of this embodiment, if the receiver is an image communication apparatus in psuedo conformity to G3 facsimile, it is possible to transmit a transmitting mode, for instance a color mode or monochromatic mode, to the receiver according to a non-standard initialization descrimination signal, for instance an NSF signal. For example, in case of an image communication apparatus in pseudo conformity to G4 facsimile, it may be adapted to permit transmission of a transmitting mode, for instance a color mode or a monochromatic mode, to the receiver according to a user-user signal shown in layer 3 specification 4.5.24, ISDN Network Interface Part 3 of the TTC Recommendation. Particularly, with the ISDN network the transmission time can be reduced, which is very convenient for an apparatus in which received data is tentatively stored in memory as in this embodiment.

Another embodiment

In this embodiment, image data is once stored in memory. However, it is logical to arrange such that in color reception no data is preserved if recording is done in a color recording mode and data is preserved if recording is done in a monochromatic recording mode in spite of color reception.

Further, with an arrangement such that of about 20 frames, for instance, of color received data which is recorded by monochromatic recording only necessary data can be taken out from hard disk and recorded in by color recording, it is possible to dispense with unnecessary color recording. Alternatively, it is possible to permit confirmation by color display.

In an embodiment of the invention, in a color facsimile apparatus provided with an ink jet recording apparatus with a plurality of color ink heads for different colors, there are provided mode determining means for determining a monochromatic receiving mode and a color receiving mode, and instructing means for instructing monochromatic printing are provided, and further control means is provided to permit recording with the monochromatic ink head according to a signal from the instructing means. Thus, it is possible to permit monochromatic recording of color received image data.

By permitting monochromatic recording of color received data, it is possible to reduce recording time. In addition, the amount of ink used is far reduced compared to color recording, which is economical. Further, with preservation of data in the hard disk it is possible to utilize monochromatically recorded image for retrieval, and thus it is possible to improve operability when a large number of image frames are received.

Further, in this embodiment if one of the color ink heads is incapable of use at the time of color reception, recording is done in monochromatic ink. However, it is possible to arrange such that if the yellow ink head, for instance, has trouble, recording is done in two colors of cyan and magenta. Alternatively, black portions in color image are recorded in black color while recording color portions in cyan. If color portion is recorded in cyan, it can be noticed at a glance, thus facilitating a check as to whether color recording is to be done anew.

Further, it is convenient to arrange such that if recording is done in a substitute ink, it is automatically informed to the opposite side of transmission.

As has been shown above, with this embodiment in the presence of an ink head incapable of use a different ink head can be used in substitution, thus permitting continual receiving operation.

Further, if the operator: confirms image recorded in a substitute ink and determines that it is necessary to record data anew in the right color, a message of repeating of transmission may be given to the opposite side of transmission. Alternatively, since a hard disk is provided in this embodiment, correct received image data is preserved, and thus recording may be done anew after carrying out maintenance of the recording apparatus.

By completing the receiving operation and providing an image, some information can be transmitted although color information may not be right, the operation time may be reduced compared to the case of refusing reception.

In case where such ink jet printer is used in a color facsimile apparatus having two modes, i.e., color and monochromatic modes, and four heads of Y, M, C and Bk cover space between positions facing the leading and trailing ends of paper in their movement in the direction of their row irrespective of the mode, even when the monochromatic mode is designated, that is, even when sole black ink is used, the heads of Y, M and C which are not used are also moved from the leading end to the trailing end of paper.

In view of maintenance, a consumable head has been devised, which is of cartridge type, in which an ink tank and a head are provided integrally. In case where such heads are juxtaposed in a row for Y, M, C and Bk, an interhead spacing of 20-30 mm is necessary.

In such apparatus, unnecessary movement for 60 to 90 mm is to require excess time involved in the monochromatic mode. With this embodiment, however, i.e., with a color facsimile apparatus having an ink jet recording apparatus having juxtaposed black and color ink heads for forming image with relative movement of the ink heads and paper in the direction of row of the heads, comprising receiving mode determining means for determining either monochromatic or color receiving mode, a first recording mode, in which the black ink head is relatively moved to a predetermined position, and a second recording mode, in which the color ink heads are moved to that predetermined position, the second recording mode is selected in color receiving mode, while the first receiving mode is selected in monochromatic receiving mode. It is thus possible to obtain high speed recording operation either in the color receiving mode or in the monochromatic receiving mode.

Another Embodiment

In the above embodiment, four ink heads are used for the respective colors of black, cyan, magenta and yellow. However, the kinds and number of colors are by no means limitative. For example, if a thin color ink is provided in addition to each color ink to enhance power of expression of intermediate tone, a total of eight colors are involved. In such case, the present invention is particularly effective. More specifically, where individual heads are arranged at an interval of 30 mm, the spacing between the opposite end heads is 90 mm in case of four colors, but it is 210 mm in case of eight colors. With an A4 printer, the heads are moved by an extra distance of 210 mm in addition to a paper width of 210 mm in case of color recording. In case of the monochromatic recording, the extra distance movement can be dispensed with, thus leading to a great time reduction.

As has been described in the foregoing, according to the invention it is possible to quickly confirm received data and eliminate wasteful ink consumption.

Further, it is possible to prevent failure of reception in color facsimile apparatus as much as possible.

Furthermore, it is possible to reduce the recording time for the ink heads that are moved in accordance with the receiving mode.

What is claimed is:

1. A color facsimile apparatus comprising:
   receiving means for receiving color data through a line;
   means for forming an image corresponding to the color data received by said receiving means by depositing plural kinds of colorants, wherein said forming means is operable in two printing modes, a color printing mode and a monochromatic printing mode;
   means for checking for non-depositing by said forming means; and
   control means for controlling the printing mode of said forming means in accordance with said checking means.

2. The color facsimile apparatus according to claim 1, which further comprises storage means for storing the received color data.

3. The color facsimile apparatus according to claim 2, wherein said control means causes monochromatic printing of color data stored in said storage means.

4. The color facsimile apparatus according to claim 2, wherein said control means causes the color data to be held in said storage means when monochromatic printing is instructed by said control means.

5. The color facsimile apparatus according to claim 1, wherein said control means includes a manual switch.

6. The color facsimile apparatus according to claim 1, wherein said image forming means comprises ink jet printing means.

7. The color facsimile apparatus according to claim 6, wherein said ink jet printing means comprises means for discharging ink by printing means comprises means for discharging ink by utilizing heat energy.

8. The facsimile apparatus according to claim 7, wherein said ink jet printing means discharges ink through filmy effervescence.

9. A color facsimile apparatus comprising:
   reproducing means for reproducing an image corresponding to a received color image signal for each color used;
   determining means for determining a reproducing capacity of said reproducing means; and
   storage means for holding said received color image signal according to a determination of said determining means that said reproducing means is not capable of reproduction for each color.

10. The color facsimile apparatus according to claim 9, wherein said storage means holds the received color image signal such that the signal can be canceled when it is determined by said determining means that said reproducing means is capable of reproduction for each color.

11. The color facsimile apparatus according to claim 9, wherein said reproducing means reproduces the image with a coloring material.

12. The color facsimile apparatus according to claim 11, wherein said determining means determines the reproducing capacity by detecting a remaining amount of said coloring material.

13. The color facsimile apparatus according to claim 9, wherein said reproducing means comprises ink jet recording means.

14. The color facsimile apparatus according to claim 13, wherein said ink jet recording means discharges ink through filmy effervescence.

15. The color facsimile apparatus according to claim 9, wherein said storage means comprises a hard disk.

16. A color facsimile apparatus for performing recording with relative movement of a plurality of ink heads for respective colors and a recording material in a direction of a row of said ink heads, said apparatus comprising:
   determining means for determining a monochromatic receiving mode and a color receiving mode; and
   control means for controlling a magnitude of the relative movement according to the receiving mode determined by said determining means.

17. The color facsimile apparatus according to claim 16, wherein said control means controls the distance of the relative movement according to the received mode.

18. The color facsimile apparatus according to claim 17, wherein said control means limits the distance of the relative movement to a small distance when the receiving mode is the monochromatic mode.

19. The color facsimile apparatus according to claim 16, wherein each ink head discharges ink by utilizing heat energy.

20. The color facsimile apparatus according to claim 19, wherein each ink head discharges ink through filmy effervescence.

21. A color facsimile apparatus having an ink jet recording apparatus for forming an image with relative movement between juxtaposed black and color ink heads and recording paper in a direction of a row of said heads, said facsimile apparatus comprising:

receiving mode determining means for determining a monochromatic receiving mode and a color receiving mode;

control means for selecting a first recording mode, in which said black ink head is relatively moved to a predetermined position, and a second recording mode, in which said color ink heads are relatively moved to the predetermined position.

22. The color facsimile apparatus according to claim 21, wherein the distance of movement in said first recording mode is equal to the distance of movement in said second recording mode.

23. The color facsimile apparatus according to claim 21, wherein said monochromatic ink head is provided at an end of the row of heads in the direction of the relative movement.

24. The color facsimile apparatus according to claim 21, wherein each ink head discharges ink by utilizing heat energy.

25. The color facsimile apparatus according to claim 24, wherein each ink head discharges ink through filmy effervescence.

26. The color facsimile apparatus according to claim 9, wherein said reproducing means causes monochromatic printing of color data stored in said storage means.

* * * * *

UNITED STATES PATENT AND TRADEMARK OFFICE
CERTIFICATE OF CORRECTION

PATENT NO. : 5,349,450
DATED : September 20, 1994
INVENTOR(S) : Kiyoharu YOSHIOKA, et al.

It is certified that error appears in the above-indentified patent and that said Letters Patent is hereby corrected as shown below:

COLUMN 1:

Line 33, "time," should read --times,--.

COLUMN 5:

Line 18, "canti-lever" should read --cantilever--.

COLUMN 10:

Line 16, "every" should read --recovery--.

COLUMN 11:

Line 23, "like" should read --performance--.

COLUMN 14:

Line 38, "applicable" should read --applicable to--;
    Line 64, "signal is" should read --signals are--.

UNITED STATES PATENT AND TRADEMARK OFFICE
CERTIFICATE OF CORRECTION

PATENT NO. : 5,349,450           Page 2 of 2
DATED      : September 20, 1994
INVENTOR(S): Kiyoharu YOSHIOKA, et al.

It is certified that error appears in the above-indentified patent and that said Letters Patent is hereby corrected as shown below:

COLUMN 15:

Line 9, "com-" should be deleted;
    Line 10, "mon slit" should read --slit common--;
    Line 11, "serve" should read --serves--.

COLUMN 16:

lINE 37, "operator:" should read --operator--.

COLUMN 18:

Line 6 should be deleted in its entirety.

Signed and Sealed this

Ninth Day of May, 1995

*Attest:*

BRUCE LEHMAN

*Attesting Officer*     Commissioner of Patents and Trademarks